US010356000B2

United States Patent
Lee et al.

(10) Patent No.: US 10,356,000 B2
(45) Date of Patent: Jul. 16, 2019

(54) APPARATUS AND METHOD FOR UPLOADING DATA IN MOBILE COMMUNICATION SYSTEM SUPPORTING A PLURALITY OF RADIO ACCESS INTERFACES

(71) Applicant: Samsung Electronics Co., Ltd., Suwon-si, Gyeonggi-do (KR)

(72) Inventors: Hyun-Joo Lee, Seoul (KR); Chul-Ho Lee, Suwon-si (KR); Jin-Hyoung Kim, Seongnam-si (KR); Yong-Seok Park, Seoul (KR); Jin-Ho Lee, Seoul (KR); Joon-Young Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 15/255,861

(22) Filed: Sep. 2, 2016

(65) Prior Publication Data

US 2017/0070441 A1   Mar. 9, 2017

(30) Foreign Application Priority Data

Sep. 4, 2015 (KR) ........................ 10-2015-0125454

(51) Int. Cl.
*H04L 12/805* (2013.01)
*H04L 29/08* (2006.01)
(Continued)

(52) U.S. Cl.
CPC ........ *H04L 47/365* (2013.01); *H04L 67/2814* (2013.01); *H04L 67/2857* (2013.01);
(Continued)

(58) Field of Classification Search
CPC combination set(s) only.
See application file for complete search history.

(56) References Cited

U.S. PATENT DOCUMENTS 8,516,147 B2   8/2013  Kaspar et al.
9,036,509 B1 *  5/2015 Addepalli ............. H04W 4/046
                                                    370/259
(Continued)

FOREIGN PATENT DOCUMENTS

KR  10-2015-0025484 A   3/2015
WO     2014/113990 A1   7/2014

OTHER PUBLICATIONS

Y. Pu and A. Nakao, "A deployable upload acceleration service for mobile devices," The International Conference on Information Network 2012, Bali, 2012, pp. 350-353 http://ieeexplore.ieee.org/stamp/stamp.jsp?tp=&arnumber=6164398&isnumber=6164338.*
(Continued)

*Primary Examiner* — Mark H Rinehart
*Assistant Examiner* — Kenneth P Hunt
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for uploading data by a station (STA) in a mobile communication system supporting a plurality of radio access interfaces (RAIs) is provided. The method includes, upon detecting that there is content to be uploaded, determining whether a first RAI among the plurality of RAIs is available, and when the first RAI is available, transmitting a header message including information related to the content and a body message including at least one of a plurality of segments which are generated based on the content to a proxy server through the first RAI to upload the at least one of the plurality of segments to an original server.

17 Claims, 19 Drawing Sheets

(51) Int. Cl.
*H04W 28/08* (2009.01)
*H04W 84/04* (2009.01)
*H04W 84/12* (2009.01)
*H04W 88/06* (2009.01)

(52) U.S. Cl.
CPC .......... *H04W 28/08* (2013.01); *H04W 84/042* (2013.01); *H04W 84/12* (2013.01); *H04W 88/06* (2013.01)

(56) References Cited

U.S. PATENT DOCUMENTS

| | | | |
|---|---|---|---|
| 9,253,681 B1* | 2/2016 | Vivanco | H04W 72/1252 |
| 2006/0129631 A1* | 6/2006 | Na | H04L 29/06 |
| | | | 709/203 |
| 2006/0221917 A1* | 10/2006 | McRae | H04W 88/06 |
| | | | 370/338 |
| 2008/0056286 A1* | 3/2008 | Forssell | H04L 12/5692 |
| | | | 370/401 |
| 2010/0154044 A1 | 6/2010 | Manku | |
| 2011/0213827 A1* | 9/2011 | Kaspar | H04W 76/025 |
| | | | 709/203 |
| 2012/0259946 A1* | 10/2012 | Stockhammer | H04L 65/105 |
| | | | 709/217 |
| 2012/0324113 A1* | 12/2012 | Prince | H04L 67/2814 |
| | | | 709/226 |
| 2013/0021968 A1 | 1/2013 | Reznik et al. | |
| 2013/0067083 A1* | 3/2013 | Rodbro | H04L 69/14 |
| | | | 709/225 |
| 2014/0313954 A1 | 10/2014 | Choi et al. | |
| 2014/0317176 A1 | 10/2014 | Luecke et al. | |
| 2014/0323178 A1* | 10/2014 | Wei | H04W 76/16 |
| | | | 455/552.1 |
| 2016/0204951 A1* | 7/2016 | Walton | H04L 12/1475 |
| | | | 370/259 |

OTHER PUBLICATIONS

H. Tai, W. Chung, C. Wu, R. Chang and J. Ho, "SOP: Smart offloading proxy service for wireless content uploading over crowd events," 2015 17th International Conference on Advanced Communication Technology (ICACT), Seoul, 2015, pp. 659-662 http://ieeexplore.ieee.org/stamp/stamp.jsp?tp=&arnumber=7224878&isnumber=72.*

European Search Report dated Aug. 17, 2018, issued in the European Application No. 16842344.0.

* cited by examiner

APPARATUS AND METHOD FOR UPLOADING DATA IN MOBILE COMMUNICATION SYSTEM SUPPORTING A PLURALITY OF RADIO ACCESS INTERFACES

CROSS-REFERENCE TO RELATED APPLICATION(S)

This application claims the benefit under 35 U.S.C. § 119(a) of a Korean patent application filed on Sep. 4, 2015 in the Korean Intellectual Property Office and assigned Serial number 10-2015-0125454, the entire disclosure of which is hereby incorporated by reference.

TECHNICAL FIELD

The present disclosure relates to an apparatus and method for uploading data in a mobile communication system. More particularly, the present disclosure relates to an apparatus and method for uploading data in a mobile communication system supporting a plurality of radio access interfaces (RAIs).

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

Mobile communication systems have been rapidly progressed, and smart phones have been populated, so use of mobile data has been rapidly increased. In particular, use of mobile data through uplinks as well as downlinks has been rapidly increased, and a typical one of the use of the mobile data through the uplinks is upload of files or contents.

Accordingly, various schemes of increasing efficiency in uploading the files or contents have been proposed, and a typical one is an offloading scheme.

Even though the various schemes of increasing the efficiency in uploading the files or contents have been proposed, the files or contents need to be uploaded again from the beginning if the upload of the files or contents is failed.

A terminal needs to continuously monitor whether the upload of the files or contents is normally performed, and needs to upload the files or contents again from the beginning if the upload of the files or contents through a corresponding RAI. This may limit movement of the terminal while the upload of the files or contents is performed.

According to development of an image processing technology, high-definition video recording becomes possible, so a size of files or contents to be uploaded significantly increases. Accordingly, there is a need for a scheme of reliably uploading massive files or massive contents with a high speed.

Recently, cases that massive files or massive contents need to be shared in real time, e.g., a cloud-based personal broadcasting service, and/or the like have increased. In this case, it may be an important issue for enhancing total system performance to upload files or contents with high reliability and a high speed.

According to development of mobile communication systems, terminals have been developed, and recently, one terminal may support a plurality of radio access interfaces (RAIs). For example, a terminal may support two RAIs including a Wi-Fi interface and a LTE-advanced (LTE-A) interface.

However, in mobile communication systems which have been proposed up to now, even though a terminal supports a plurality of RAIs, the terminal uploads files or contents through one of the plurality of RAIs at a corresponding time.

The terminal uploads files or content with a limited network speed through a limited RAI. The upload of the files or the contents may fail, and this will result in service quality degradation.

Accordingly, there is a need for a scheme of reliably uploading data with a high speed in a mobile communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for uploading data in a communication system supporting a plurality of radio access interfaces (RAIs).

Another aspect of the present disclosure is to provide an apparatus and method for seamlessly uploading data in a communication system supporting a plurality of RAIs.

Another aspect of the present disclosure is to provide an apparatus and method for uploading data based on opportunistic upload in a communication system supporting a plurality of RAIs.

Another aspect of the present disclosure is to provide an apparatus and method for uploading data by considering load balancing in a communication system supporting a plurality of RAIs.

Another aspect of the present disclosure is to provide an apparatus and method for uploading data with a high speed in a communication system supporting a plurality of RAIs.

Another aspect of the present disclosure is to provide an apparatus and method for uploading data by considering stability in a communication system supporting a plurality of RAIs.

Another aspect of the present disclosure is to provide an apparatus and method for uploading data thereby decreasing retransmission overhead in a communication system supporting a plurality of RAIs.

In accordance with an aspect of the present disclosure, a method for uploading data by a station (STA) in a mobile communication system supporting a plurality of RAIs is provided. The method includes upon detecting that there is content to be uploaded, determining whether a first RAI among the plurality of RAIs is available, and when the first RAI is available, transmitting a header message including information related to the contents and a body message including at least one of a plurality of segments which are generated based on the contents to a proxy server through the first RAI to upload the at least one of the plurality of segments to an original server.

In accordance with another aspect of the present disclosure, a method for uploading data by a STA in a mobile communication system supporting a plurality of RAIs is provided. The method includes detecting that there is content to be uploaded, and transmitting a header message including information related to the contents and a body message including at least one of a plurality of segments which are generated based on the contents to a proxy server through each of the plurality of RAIs to upload the at least one of the plurality of segments to an original server.

In accordance with another aspect of the present disclosure, a method for supporting data upload of a STA by a proxy server in a mobile communication system supporting a plurality of RAIs is provided. The method includes receiving a header message including information related to content to be uploaded by the STA to an original server and a body message including at least one of a plurality of segments which are generated based on the contents, wherein the header message and the body message are transmitted through at least one of the plurality of RAIs.

In accordance with another aspect of the present disclosure, a STA in a mobile communication system supporting a plurality of RAIs is provided. The STA includes a controller configured to determine whether a first RAI among the plurality of RAIs is available upon detecting that there are contents to be uploaded, and a transceiver configured to transmit a header message including information related to the contents and a body message including at least one of a plurality of segments which are generated based on the contents to a proxy server through the first RAI to upload the at least one of the plurality of segments to an original server if the first RAI is available.

In accordance with another aspect of the present disclosure, a STA in a mobile communication system supporting a plurality of RAIs is provided. The STA includes a controller configured to detect that there are contents to be uploaded, and a transceiver configured to transmit a header message including information related to the contents and a body message including at least one of a plurality of segments which are generated based on the contents to a proxy server through each of the plurality of RAIs to upload the at least one of the plurality of segments to an original server.

In accordance with another aspect of the present disclosure, a proxy server supporting data upload of a STA in a mobile communication system supporting a plurality of RAIs is provided. The proxy server includes a transceiver configured to receive a header message including information related to contents to be uploaded by the STA to an original server and a body message including at least one of a plurality of segments which are generated based on the contents, wherein the header message and the body message are transmitted through at least one of the plurality of RAIs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
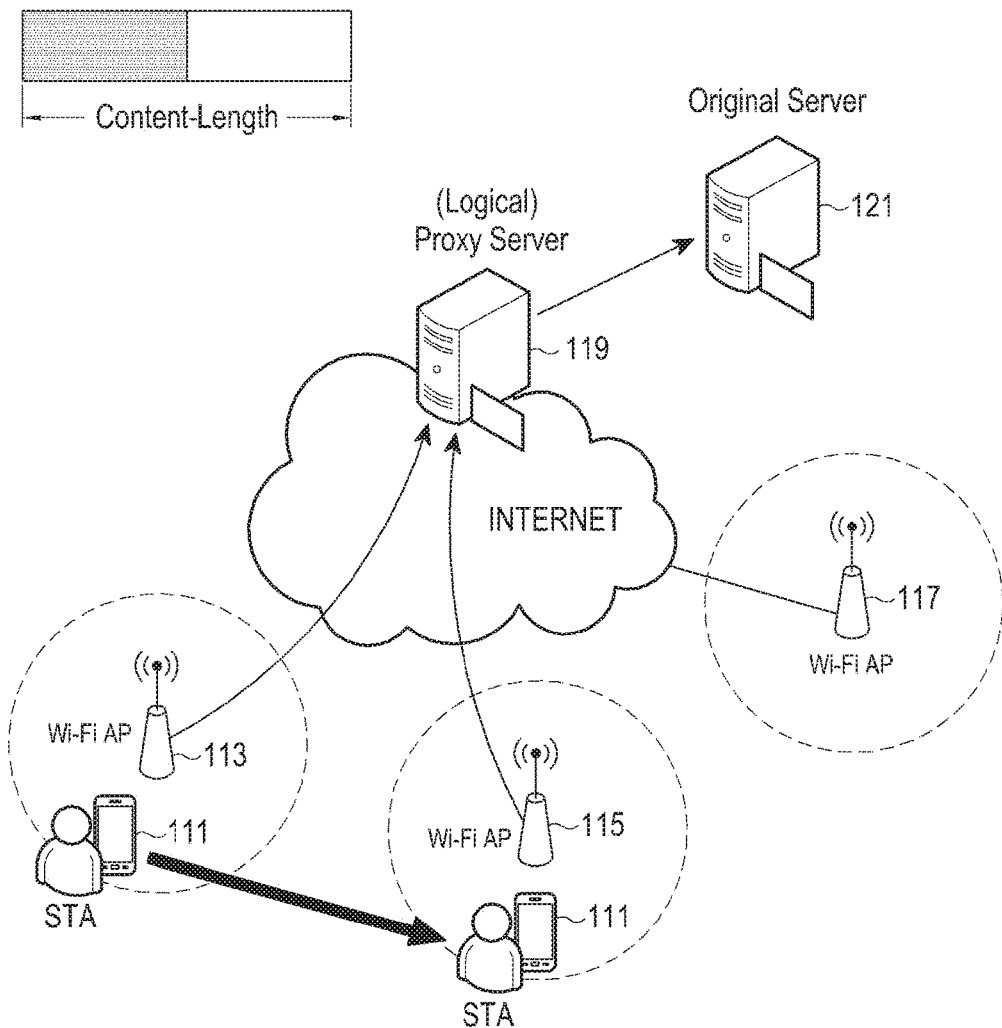
FIG. 1 schematically illustrates an example of an upload process which is based on an opportunistic upload scheme in a communication system supporting a plurality of radio access interfaces (RAIs) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital video disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, a device which is installed at a vehicle, and attachable and detachable from the vehicle, a device which is installed at a vehicle, and impossible to remove from the vehicle, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a station (STA) may be an electronic device.

According to various embodiments of the present disclosure, for example, an STA operates as a transmitting apparatus for uploading data, and a proxy server operates as a receiving apparatus for receiving data.

According to various embodiments of the present disclosure, a base station (BS) operates as an apparatus for receiving and transmitting data.

In various embodiments of the present disclosure, it will be noted that the term BS may be interchangeable with the term access point (AP), evolved node B (eNB), and/or the like.

In various embodiments of the present disclosure, it will be noted that the term STA may be interchangeable with the term mobile station (MS), wireless terminal, mobile device, user equipment (UE), and/or the like.

An embodiment of the present disclosure proposes an apparatus and method for uploading data in a communication system supporting a plurality of radio access interfaces (RAIs).

An embodiment of the present disclosure proposes an apparatus and method for seamlessly uploading data in a communication system supporting a plurality of RAIs.

An embodiment of the present disclosure proposes an apparatus and method for uploading data based on opportunistic upload in a communication system supporting a plurality of RAIs.

An embodiment of the present disclosure proposes an apparatus and method for uploading data by considering load balancing in a communication system supporting a plurality of RAIs.

An embodiment of the present disclosure proposes an apparatus and method for uploading data with a high speed in a communication system supporting a plurality of RAIs.

An embodiment of the present disclosure proposes an apparatus and method for uploading data by considering stability in a communication system supporting a plurality of RAIs.

An embodiment of the present disclosure proposes an apparatus and method for uploading data thereby decreasing retransmission overhead in a communication system supporting a plurality of RAIs.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16ad communication system, an IEEE 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVB-H), an advanced TV systems committee-mobile/handheld (ATSC-M/H) service, and the like, an IP TV, a moving picture experts group (MPEG) media transport (MMT) system, and/or the like.

An example of an upload process which is based on an opportunistic upload scheme in a communication system supporting a plurality of RAIs according to an embodiment of the present disclosure will be described with reference to FIG. 1.

FIG. 1 schematically illustrates an example of an upload process which is based on an opportunistic upload scheme in a communication system supporting a plurality of RAIs according to an embodiment of the present disclosure.

Referring to FIG. 1, an opportunistic upload scheme denotes a scheme of dividing content of relatively large size for which delay is possible on a preset data unit basis, e.g., on a segment basis and opportunistically uploading segments whenever a wireless local access network (WLAN) connection is established. The content may include at least one segment, and one session identifier (ID) is allocated to one content. For example, the WLAN connection may include a Wi-Fi connection, a millimeter wave (mmWave) connection, and/or the like. In FIG. 1, for convenience, it will be assumed that the WLAN connection is a Wi-Fi connection.

Further, in FIG. 1, an upload object is content, however, the upload object may be various forms such as a file, a service package, and/or the like as well as the contents.

It will be noted that the upload process which is based on the opportunistic upload scheme in FIG. 1 is an upload process in a case that one preset RAI, e.g., a Wi-Fi scheme is used. A scheme of performing an upload process based on a plurality of RAIs, e.g., a Wi-Fi scheme and an LTE scheme will be described below, so a detailed description thereof will be omitted herein.

The communication system includes an STA 111, a plurality of Wi-Fi APs, e.g., three Wi-Fi APs, e.g., a Wi-Fi AP #1 113, a Wi-Fi AP #2 115, and a Wi-Fi AP #3 117, a proxy server 119, and an original server 121. The proxy server 119 is a logical server.

Upon detecting that there is content to be uploaded, the STA 111 determines whether it is possible to use a Wi-Fi scheme. If it is possible to use the Wi-Fi scheme, the STA 111 allocates a session ID for an upload session. In FIG. 1, for example, it will be assumed that the session ID for the upload session is "cloud.example.org:j6oAOxCWZh/CD723LGeXlf".

The STA 111 starts uploading the content to the proxy server 119 using a message, e.g., a hypertext transfer protocol range-request (HTTP range-request) message, including an IP address of a destination to which the STA 111 will upload the contents, i.e., an IP address of a final server to which the STA 111, e.g., an IP address of the original server 121 will upload the content, and information related to a content-length of the content to be uploaded. The HTTP range-request message includes an HTTP request header field, and the HTTP request header field may include a destination IP address, a session ID, information related to a contents-length, and information related to a range of content.

After receiving the HTTP range-request message from the STA 111, the proxy server 119 receives content from the STA 111 while detecting and maintaining session information about the STA 111 including the session ID included in the HTTP range-request message, and monitors a content upload state of the STA 111. Upon detecting that contents upload from the STA 111 has been completed while receiving the content from the STA 111, the proxy server 119 uploads the content for which the upload has been completed to the original server 121.

Meanwhile, a case that the STA 111 uploads the content to the original server 121 without a log-in process for the original server 121 has been described above. However, the STA 111 may upload the content after performing the log-in process for the original server 121, and this will be described below.

If there is a need for a log-in process for using a service provided by the original server 121, the STA 111 may include user account information into an HTTP request header field. Whether there is the need for the log-in process is determined by the STA 111, and the STA 111 includes the user account information of the STA 111 into the HTTP request header field if there is the need for the log-in process. The user account information of the STA 111 may be included into all HTTP range-request messages, or a specific HTTP range-request message, e.g., the first HTTP range-request message or the last HTTP range-request message.

If the user account information is included in the HTTP range-request message received from the STA 111, the proxy server 119 performs a log-in process for the original server 121 based on the user account information when the content upload from the STA 111 has been completed.

In a case that content are to be uploaded as described in FIG. 1, even though it is impossible for an STA to upload content based on a Wi-Fi scheme while uploading the content based on the Wi-Fi scheme, the STA uploads remaining data except for the uploaded data among the content without uploading the content again from the beginning, so retransmission overhead may be decreased.

In a case that content is to be uploaded as described in FIG. 1, an STA may upload content in a background form whenever it is possible to use a Wi-Fi scheme, i.e., whenever a Wi-Fi connection is established without user's intervention. Accordingly, content upload which is based on this opportunistic upload scheme increases user convenience.

An example of an upload process which is based on an opportunistic upload scheme in a communication system supporting a plurality of RAIs according to an embodiment of the present disclosure has been described with reference to FIG. 1, and an example of a message transmitting/receiving process according to an upload process which is based on an opportunistic upload scheme in a communication system supporting a plurality of RAIs according to an embodiment of the present disclosure will be described with reference to FIGS. 2A and 2B.

Figure 2A:
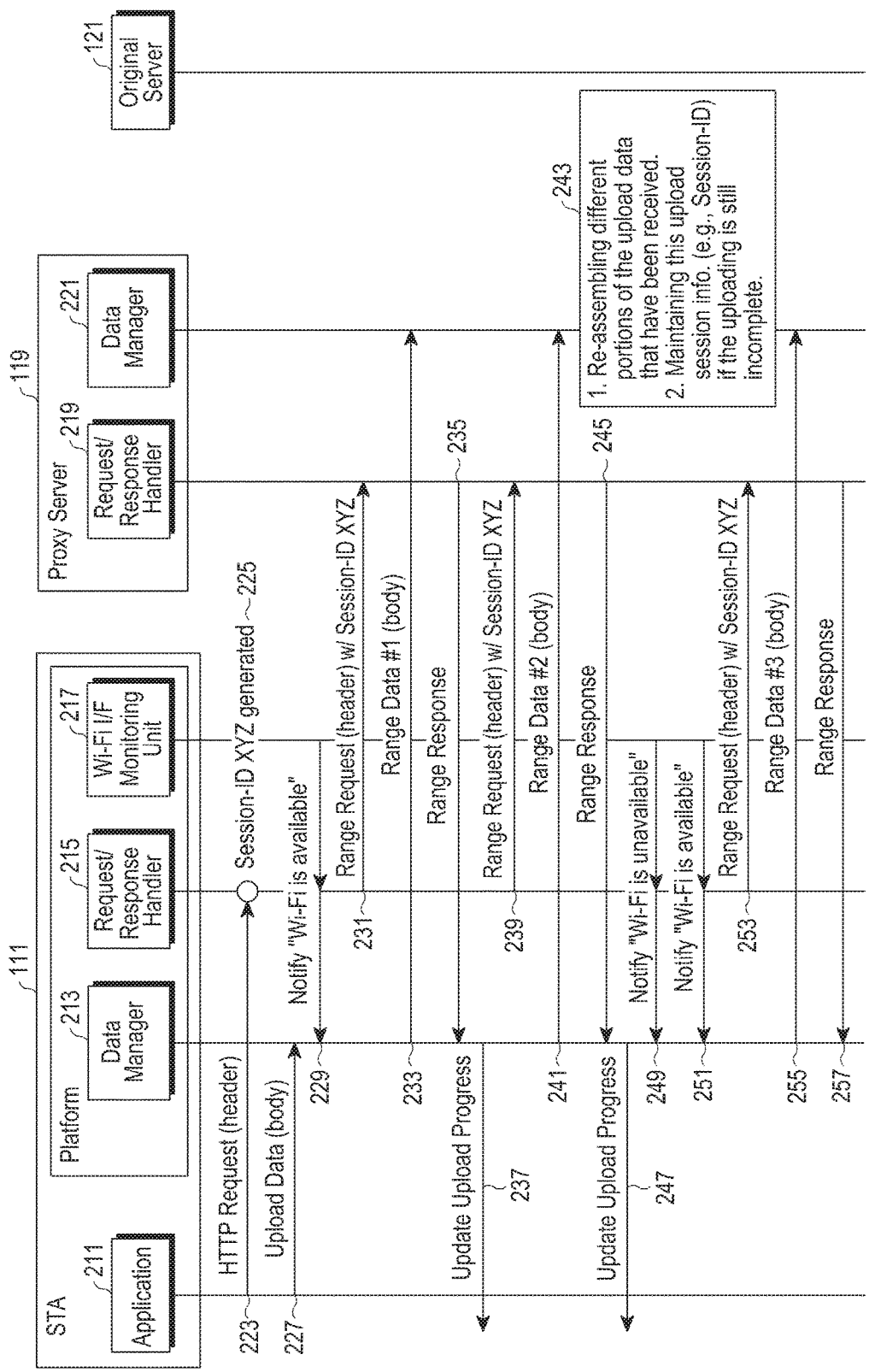
FIGS. 2A and 2B schematically illustrate an example of a message transmitting/receiving process according to an upload process which is based on an opportunistic upload scheme in a communication system supporting a plurality of RAIs according to an embodiment of the present disclosure.
Figure 2B:
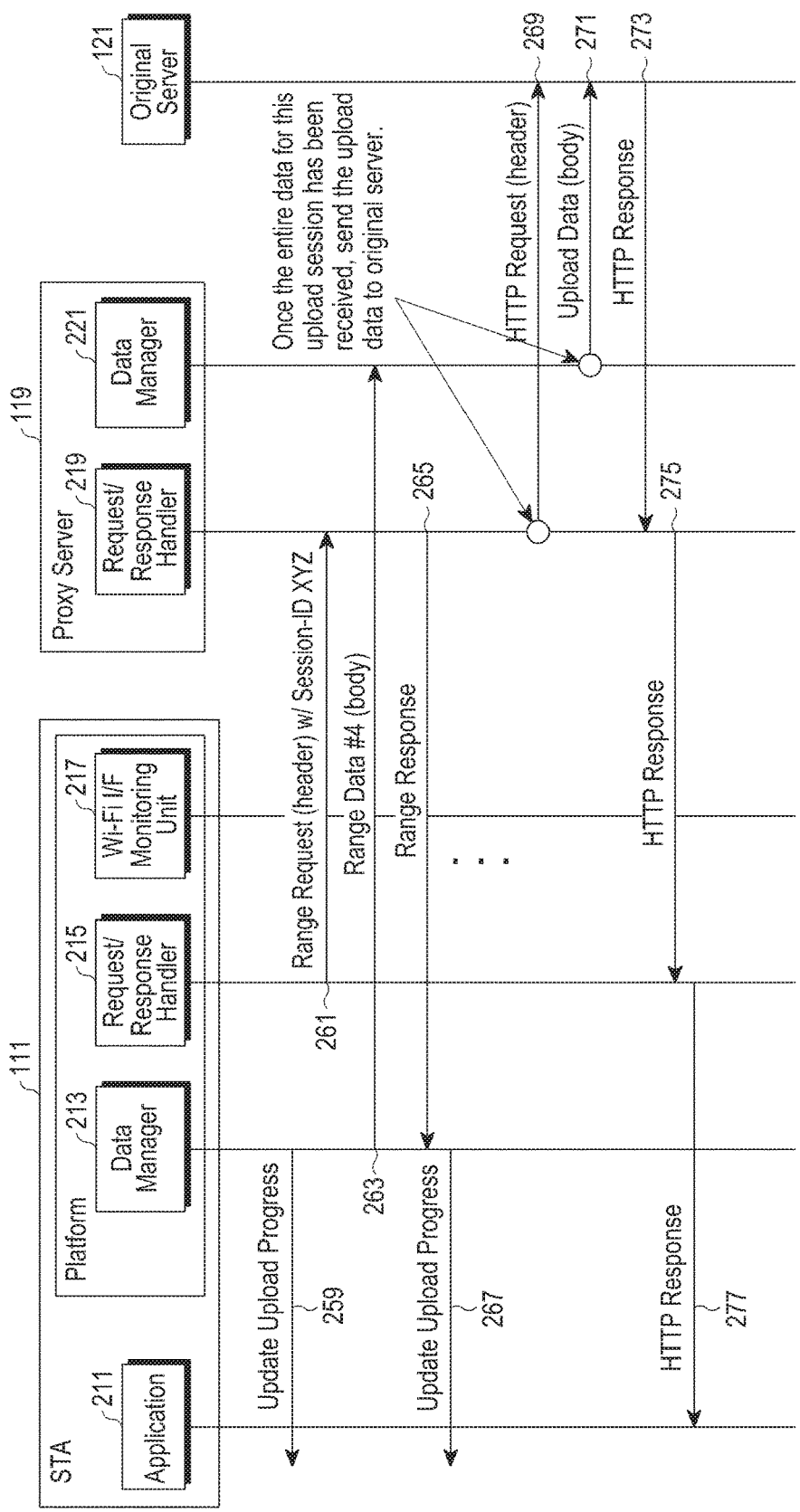

FIGS. 2A and 2B schematically illustrate an example of a message transmitting/receiving process according to an upload process which is based on an opportunistic upload scheme in a communication system supporting a plurality of RAIs according to an embodiment of the present disclosure.

Referring to FIGS. 2A and 2B, the communication system includes an STA 211, a proxy server 119, and an original server 121.

The STA 111 includes an application 211 and a platform, and the platform includes a data manager 213, a request/response handler 215, and a Wi-Fi interface (I/F) monitoring unit 217.

The proxy server 119 includes a request/response handler 219 and a data manager 221.

Upon detecting that content to be uploaded occurs, the application 211 of the STA 111 delivers an HTTP Request Header message including information indicating that there is content to be uploaded to the request/response handler 215 of the STA 111 at operation 223. Upon receiving the HTTP Request Header message, the request/response handler 215 of the STA 111 generates a session ID for a session used for uploading content of the STA 111 based on the HTTP Request Header message at operation 225. In FIGS. 2A and 2B, for example, it will be assumed that the session ID is "XYZ".

The application 211 of the STA 111 delivers data to be uploaded to the data manager 213 of the STA 111 through an HTTP Request Body message at operation 227.

The Wi-Fi I/F monitoring unit 217 of the STA 111 determines whether it is possible to currently use a Wi-Fi scheme, and notifies to the data manager 213 of the STA 111 that the Wi-Fi scheme is available if it is possible to currently use the Wi-Fi scheme, that is, if the Wi-Fi scheme is available at operation 229. A scheme of notifying that the Wi-Fi scheme is available may be implemented with various forms. For example, it is notified that the Wi-Fi scheme is available by transmitting a message including information indicating that the Wi-Fi scheme is available.

The request/response handler 215 of the STA 111 transmits an HTTP Range Request Header message to the request/response handler 219 of the proxy server 119 at operation 231. The HTTP Range Request Header message includes the HTTP Request Header message received from the application 211 of the STA 111 and the generated session ID, i.e., XYZ. The data manager 213 of the STA 111 transmits a segment of a corresponding range, e.g., a data #1 to the data manager 221 of the proxy server 119 through an HTTP Range Request Body message at operation 233.

Upon receiving the HTTP Range Request Body message through the data manager 221 at operation 233, the proxy server 119 transmits an HTTP Range Response message to the data manager 213 of the STA 111 through the request/response handler 219 at operation 235. Upon receiving the HTTP Range Response message from the proxy server 119, the data manager 213 of the STA 111 updates upload progress at operation 237.

Since the upload of the content has not been completed, the request/response handler 215 of the STA 111 transmits an HTTP Range Request Header message to the request/response handler 219 of the proxy server 119 at operation 239. The HTTP Range Request Header message includes the HTTP Request Header message received from the application 211 of the STA 111 and the session ID XYZ. The data manager 213 of the STA 111 transmits a segment of a corresponding range, e.g., data #2 to the data manager 221 of the proxy server 119 through an HTTP Range Request Body message at operation 241.

Upon detecting that a plurality of different segments for content for which an upload process is progressed are received, the data manager 221 of the proxy server 119 reassembles the plurality of segments. If the upload process has not been completed, that is, if the upload process is still progressed, the data manager 221 of the proxy server 119 maintains session information for a corresponding session, i.e., a session ID at operation 243.

Upon receiving the HTTP Range Request Body message through the data manager 221 at operation 241, the proxy server 119 transmits an HTTP Range Response message to the data manager 213 of the STA 111 through the request/response handler 219 at operation 245. Upon receiving the HTTP Range Response message from the proxy server 119, the data manager 213 of the STA 111 updates upload progress at operation 247.

While the upload process of the content is performed, the Wi-Fi monitoring unit 217 continuously monitors whether the Wi-Fi scheme is available, and notifies the data manager 213 of the STA 111 that the Wi-Fi scheme is unavailable through the request/response handler 215 of the STA 111 if the Wi-Fi scheme is unavailable at operation 249. A scheme of notifying that the Wi-Fi scheme is unavailable may be implemented with various forms. For example, it may be notified that the Wi-Fi scheme is unavailable by transmitting a message including information indicating that the Wi-Fi scheme is unavailable.

After the request/response handler 215 of the STA 111 notifies that the Wi-Fi scheme is unavailable, the upload process of the content is not performed any more.

Thereafter, the Wi-Fi monitoring unit 217 continuously monitors whether the Wi-Fi scheme is available, and notifies the data manager 213 of the STA 111 that the Wi-Fi scheme is available through the request/response handler 215 of the STA 111 if the Wi-Fi scheme is available at operation 251.

Meanwhile, the upload for the content has not been completed, and the Wi-Fi scheme becomes available again, so the request/response handler 215 of the STA 111 transmits an HTTP Range Request Header message to the request/response handler 219 of the proxy server 119 at operation 253. The HTTP Range Request Header message includes the HTTP Request Header message received from the application 211 of the STA 111 and the session ID XYZ. The data manager 213 of the STA 111 transmits a segment of a corresponding range, e.g., data #3 to the data manager 221 of the proxy server 119 through an HTTP Range Request Body message at operation 255.

Upon receiving the HTTP Range Request Body message through the data manager 221 at operation 255, the proxy server 119 transmits an HTTP Range Response message to the data manager 213 of the STA 111 through the request/response handler 219 at operation 257. Upon receiving the HTTP Range Response message from the proxy server 119, the data manager 213 of the STA 111 updates upload progress at operation 259.

The upload for the content has not been completed, so the request/response handler 215 of the STA 111 transmits an HTTP Range Request Header message to the request/response handler 219 of the proxy server 119 at operation 261. The HTTP Range Request Header message includes the HTTP Request Header message received from the application 211 of the STA 111 and the session ID XYZ. The data manager 213 of the STA 111 transmits a segment of a corresponding range, e.g., data #4 to the data manager 221 of the proxy server 119 through an HTTP Range Request Body message at operation 263.

Upon receiving the HTTP Range Request Body message through the data manager 221 at operation 263, the proxy server 119 transmits an HTTP Range Response message to the data manager 213 of the STA 111 through the request/response handler 219 at operation 265. Upon receiving the HTTP Range Response message from the proxy server 119, the data manager 213 of the STA 111 updates upload progress at operation 267.

When the upload for the content has been completed with the above scheme (i.e., when all segments included in the content are received from the STA 111), the request/response handler 219 of the proxy server 119 needs to upload the content received from the STA 111, i.e., the content for which upload has been completed. The request/response handler 219 of the proxy server 119 transmits an HTTP Request Header message to the original server 121 at operation 269. The HTTP Request Header message transmitted at operation 269 is the same as the HTTP Request Header message transmitted at operation 223.

The data manager 221 of the proxy server 119 uploads the content received from the STA 111 to the original server 121 through an HTTP Request Body message at operation 271.

Upon receiving the HTTP Request Body message from the data manager 221 of the proxy server 119, the original server 121 transmits an HTTP Response message to the request/response handler 219 of the proxy server 119 at operation 273. Upon receiving the HTTP Response message from the original server 121, the request/response handler 219 of the proxy server 119 transmits an HTTP Response message to the request/response handler 215 of the STA 111 at operation 275. Upon receiving the HTTP Response message from the request/response handler 219 of the proxy server 119, the request/response handler 215 of the STA 111 delivers an HTTP Response message to the application 211 of the STA 111 at operation 277.

Upon receiving the HTTP Response message from the request/response handler 215 of the STA 111, the application 211 of the STA 111 may detect that the content upload to the original server 121 has been completed.

Although FIGS. 2A and 2B illustrate an example of a message transmitting/receiving process according to an upload process which is based on an opportunistic upload scheme in a communication system supporting a plurality of RAIs according to an embodiment of the present disclosure, various changes could be made to FIGS. 2A and 2B. For example, although shown as a series of operations, various operations in FIGS. 2A and 2B could overlap, occur in parallel, occur in a different order, or occur multiple times.

An example of a message transmitting/receiving process according to an upload process which is based on an opportunistic upload scheme in a communication system supporting a plurality of RAIs according to an embodiment of the present disclosure has been described with reference to FIGS. 2A and 2B, and another example of a message transmitting/receiving process according to an upload process which is based on an opportunistic upload scheme in a communication system supporting a plurality of RAIs according to an embodiment of the present disclosure will be described with reference to FIGS. 3A and 3B.

Figure 3A:
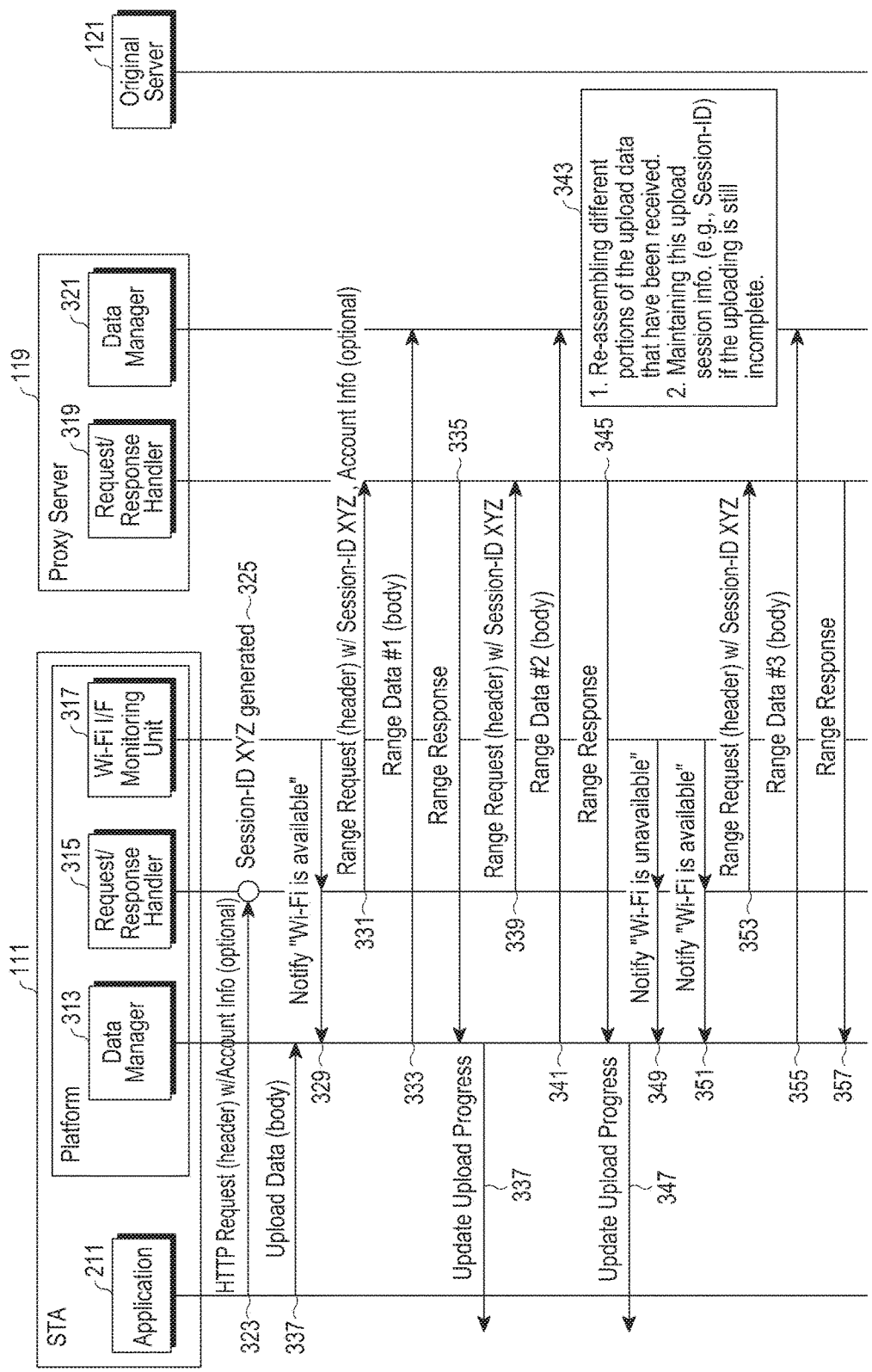
FIGS. 3A and 3B schematically illustrate another example of a message transmitting/receiving process according to an upload process which is based on an opportunistic upload scheme in a communication system supporting a plurality of RAIs according to an embodiment of the present disclosure.
Figure 3B:
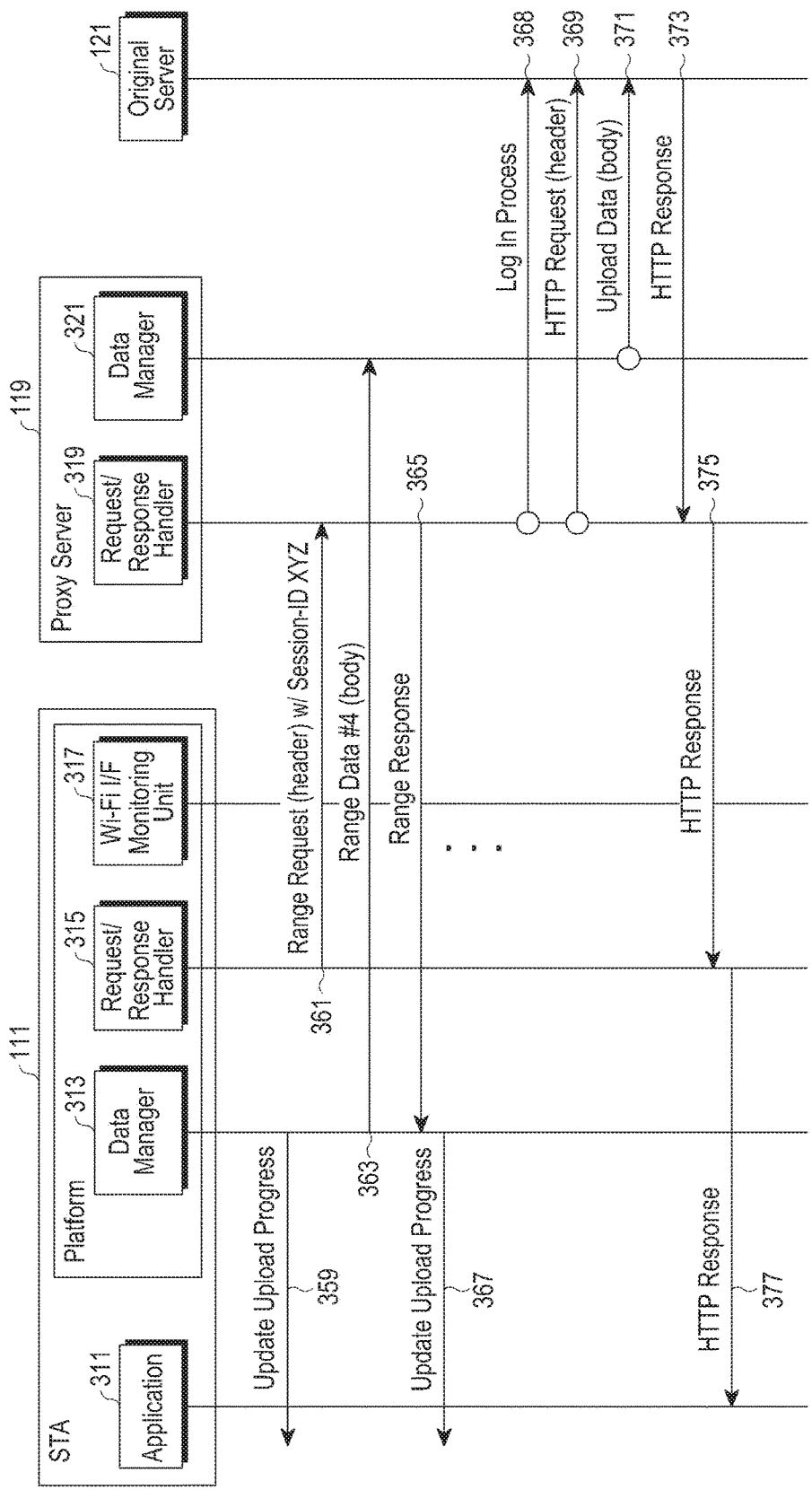

FIGS. 3A and 3B schematically illustrate another example of a message transmitting/receiving process according to an upload process which is based on an opportunistic upload scheme in a communication system supporting a plurality of RAIs according to an embodiment of the present disclosure.

Referring to FIGS. 3A and 3B, a message transmitting/receiving process according to an upload process which is based on an opportunistic upload scheme in FIGS. 3A and 3B is the same as a message transmitting/receiving process according to an upload process which is based on an opportunistic upload scheme in FIGS. 2A and 2B except that a log-in process is additionally performed.

The communication system includes an STA 111, a proxy server 119, and an original server 121.

The STA 111 includes an application 311 and a platform, and the platform includes a data manager 313, a request/response handler 315, and a Wi-Fi I/F monitoring unit 317.

The proxy server 119 includes a request/response handler 319 and a data manager 321.

As described above, in the message transmitting/receiving process according to the upload process which is based on the opportunistic upload scheme in FIGS. 3A and 3B, the log-in process is additionally performed compared to the message transmitting/receiving process according to the upload process which is based on the opportunistic upload scheme in FIGS. 2A and 2B, so the application 311 of the STA 111 delivers an HTTP Request Header message including information indicating that there are content to be uploaded and user account information of the STA 111 to the request/response handler 315 of the STA 111 upon detecting that the content to be uploaded occurs at operation 323. Upon receiving the HTTP Request Header message, the request/response handler 315 of the STA 111 generates a session ID of a session used for uploading content of the STA 111 based on the HTTP Request Header message at operation 325. In FIGS. 3A and 3B, for example, it will be assumed that the session ID is XYZ.

The application 311 of the STA 111 delivers data to be uploaded to the data manager 313 of the STA 111 through an HTTP Request Body message at operation 327.

The Wi-Fi I/F monitoring unit 317 of the STA 111 determines whether it is possible to currently use a Wi-Fi scheme, and notifies to the data manager 313 of the STA 111 that the Wi-Fi scheme is available if it is possible to currently use the Wi-Fi scheme (i.e., if the Wi-Fi scheme is available) at operation 329.

The request/response handler 315 of the STA 111 transmits an HTTP Range Request Header message to the request/response handler 319 of the proxy server 119 at operation 331. The HTTP Range Request Header message includes the HTTP Request Header message received from the application 311 of the STA 111, the generated session ID, i.e., XYZ, and the user account information of the STA 111.

Operations thereafter, i.e., operations 333 to 367 are the same as operations 233 to 267 as described in FIGS. 2A and 2B, so a detailed description thereof will be omitted herein.

When the upload for the content has been completed with the above scheme (i.e., when all segments included in the content are received from the STA 111), the request/response handler 319 of the proxy server 119 needs to upload the content received from the STA 111, i.e., the content for which upload has been completed to the original server 121. The request/response handler 319 of the proxy server 119 performs a log-in process with the original server 121. Here, the request/response handler 319 of the proxy server 119 performs the log-in process with the original server 121 based on the user account information received from the request/response handler 315 of the STA 111 at operation 331 at operation 368. The log-in process which is based on the user account information may be implemented with various forms, and a detailed description thereof will be omitted herein.

After performing the log-in process, the request/response handler 319 of the proxy server 119 transmits an HTTP Request Header message to the original server 121 if the log-in process is successful at operation 369.

Operations thereafter, i.e., operations 371 to 377 are the same as operations 271 to 277 as described in FIGS. 2A and 2B, so a detailed description thereof will be omitted herein.

Although FIGS. 3A and 3B illustrate another example of a message transmitting/receiving process according to an upload process which is based on an opportunistic upload scheme in a communication system supporting a plurality of RAIs according to an embodiment of the present disclosure, various changes could be made to FIGS. 3A and 3B. For example, although shown as a series of operations, various operations in FIGS. 3A and 3B could overlap, occur in parallel, occur in a different order, or occur multiple times.

Another example of a message transmitting/receiving process according to an upload process which is based on an opportunistic upload scheme in a communication system supporting a plurality of RAIs according to an embodiment of the present disclosure has been described with reference to FIGS. 3A and 3B, and an operation of performing an upload process which is based on an opportunistic upload scheme using a fixed size of segment in an STA in a communication system supporting a plurality of RAIs according to an embodiment of the present disclosure will be described with reference to FIG. 4.

Figure 4:
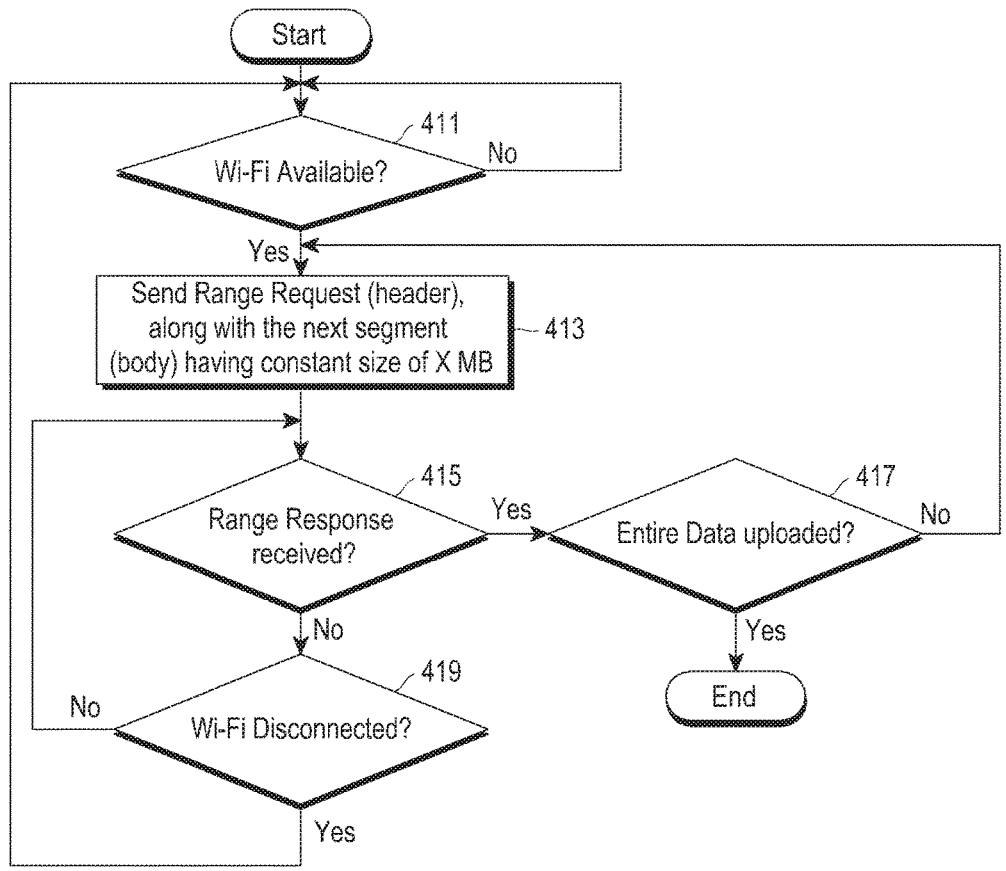
FIG. 4 schematically illustrates an operation of performing an upload process which is based on an opportunistic upload scheme using a fixed size of segment in a station (STA) in a communication system supporting a plurality of RAIs according to an embodiment of the present disclosure.

FIG. 4 schematically illustrates an operation of performing an upload process which is based on an opportunistic upload scheme using a fixed size of segment in an STA in a communication system supporting a plurality of RAIs according to an embodiment of the present disclosure.

Referring to FIG. 4, in an upload process which is based on an opportunistic upload scheme according to an embodiment of the present disclosure, a segment is used as a data unit used for uploading content, and a size of the segment may be fixed or variable. It will be noted that an operation of performing an upload process which is based on an opportunistic upload scheme as shown in FIG. 4 is an operation of performing an upload process which is based on an opportunistic upload scheme in a case that a size of a segment is fixed.

The STA determines whether a Wi-Fi scheme is available at operation 411. If the Wi-Fi scheme is available, the STA transmits an HTTP Range Request Header message and an HTTP Range Request Body message to a proxy server at operation 413. The HTTP Range Request Body message includes a segment of a fixed size, e.g., X megabytes (MBs).

The STA determines whether an HTTP Range Response message as a response message to the HTTP Range Request Body message is received from the proxy server at operation 415. If the HTTP Range Request Body message is received from the proxy server, the STA determines whether upload for the content has been completed (i.e., upload for all segments included in the content has been completed) at operation 417. If the upload for the content has not been completed, the STA returns to operation 413.

If the HTTP Range Request Body message is not received from the proxy server, the STA determines whether a Wi-Fi connection is released at operation 419. If the Wi-Fi connection is released, the STA proceeds to operation 411. If the Wi-Fi connection is not released (i.e., if the Wi-Fi scheme is available), the STA returns to operation 415.

Although not shown in FIG. 4, as described in operation 419, if the Wi-Fi connection is released while the upload process for the content is performed (i.e., if the Wi-Fi scheme becomes unavailable), the STA stops the upload process for the content and waits until the Wi-Fi scheme becomes available again.

If reception of a corresponding segment of the content is not normally performed while the proxy server receives the corresponding segment of the content from the STA, e.g., if the upload for the corresponding segment is stopped, the proxy server does not store and may discard a corresponding segment which is received until corresponding time, i.e., a part of the corresponding segment. In this case, the STA may upload again from data corresponding to start time of the corresponding segment for which the upload is stopped if the Wi-Fi scheme becomes available again.

Alternatively, if reception of a corresponding segment of the content is not normally performed while the proxy server receives the corresponding segment of the content from the STA, the proxy server may store a corresponding segment which is received until a corresponding time, i.e., a part of the corresponding segment without discarding the part of the corresponding segment. In this case, the STA may upload again from data corresponding to start time of the corresponding segment for which the upload is stopped if the Wi-Fi scheme becomes available again. For example, if the Wi-Fi scheme becomes available again, the STA may acquire a size of data which is finally updated from the proxy server through Out-of-Band Signaling, and acquire upload start time for a corresponding segment based on the acquired size.

Although FIG. 4 illustrates an operation of performing an upload process which is based on an opportunistic upload scheme using a fixed size of segment in an STA in a communication system supporting a plurality of RAIs according to an embodiment of the present disclosure, various changes could be made to FIG. 4. For example, although shown as a series of operations, various operations in FIG. 4 could overlap, occur in parallel, occur in a different order, or occur multiple times.

An operation of performing an upload process which is based on an opportunistic upload scheme using a fixed size of segment in an STA in a communication system supporting a plurality of RAIs according to an embodiment of the present disclosure has been described with reference to FIG. 4, and an operation of determining a size of a segment based on an additive increase scheme in a communication system supporting a plurality of RAIs will be described with reference to FIG. 5.

Figure 5:
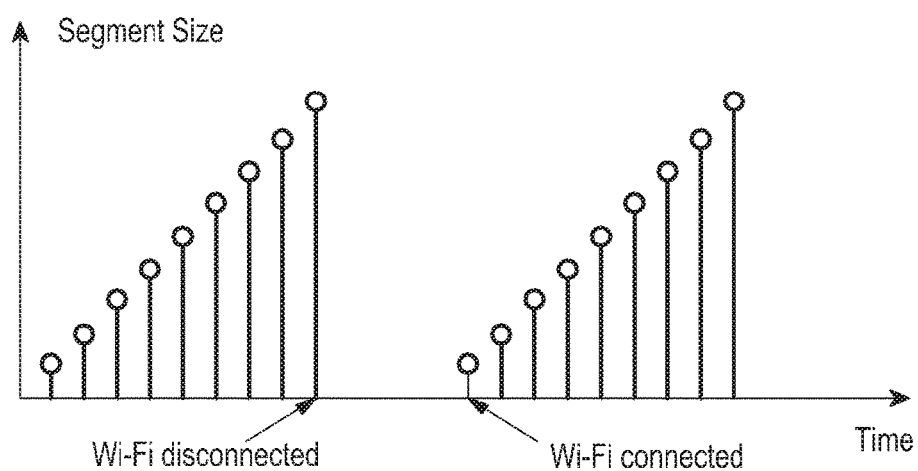
FIG. 5 schematically illustrates a process of determining a size of a segment based on an additive increase scheme in an STA in a communication system supporting a plurality of RAIs according to an embodiment of the present disclosure.

FIG. 5 schematically illustrates a process of determining a size of a segment based on an additive increase scheme in an STA in a communication system supporting a plurality of RAIs according to an embodiment of the present disclosure.

Referring to FIG. 5, the STA divides content to be uploaded on a segment basis and uploads the divided segments. In this case, the STA may variably determine a size of a segment, and one of schemes of determining the size of the segment is the additive increase scheme.

The additive increase scheme is a scheme of increasing a size of a segment by a preset unit size, e.g., a step size compared to a currently set size. In a case that the additive increase scheme is applied, a size of a segment is continuously increased corresponding to a step size until the STA stops uploading, e.g., until a Wi-Fi scheme becomes unavailable. A maximum size of the segment is predetermined, and the maximum size may be adaptively set based on a system situation of the communication system. Accordingly, the size of the segment is continuously increased corresponding to the step size, however, the increased size of the segment may not be greater than the maximum size.

If the Wi-Fi scheme becomes unavailable, the STA stops an upload process. In this case, a size of a segment is set to an initial size again. If the Wi-Fi scheme becomes available again, the STA starts uploading a segment based on the initial size.

A process of determining a size of a segment based on an additive increase scheme in an STA in a communication system supporting a plurality of RAIs according to an embodiment of the present disclosure has been described with reference to FIG. 5, and an example of an operation of performing an upload process which is based on an opportunistic upload scheme using a variable-size segment in a communication system supporting a plurality of RAIs according to an embodiment of the present disclosure will be described with reference to FIG. 6.

Figure 6:
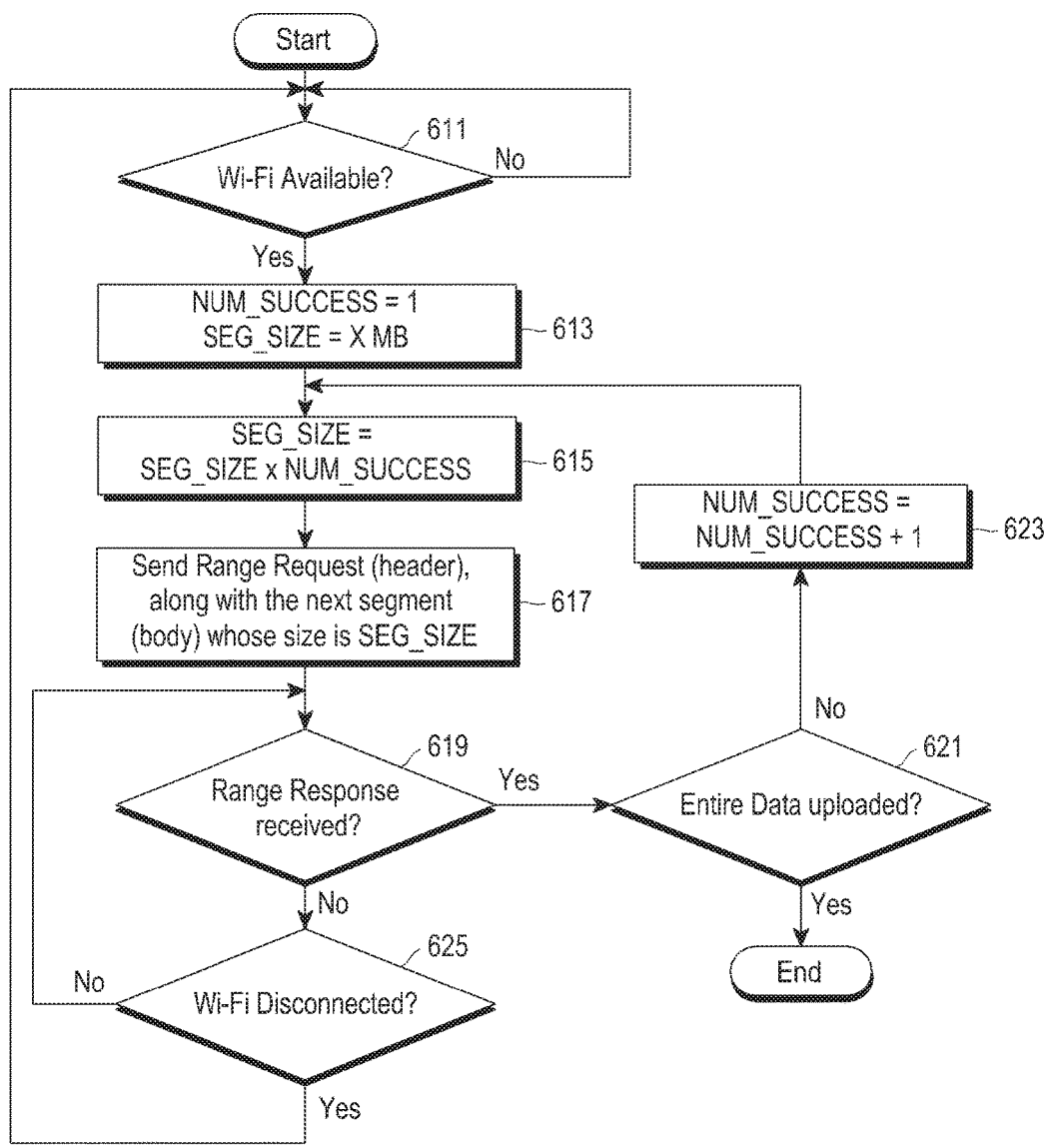
FIG. 6 schematically illustrates an example of an operation of performing an upload process which is based on an opportunistic upload scheme using a variable-size segment in an STA in a communication system supporting a plurality of RAIs according to an embodiment of the present disclosure.

FIG. 6 schematically illustrates an example of an operation of performing an upload process which is based on an opportunistic upload scheme using a variable-size segment in an STA in a communication system supporting a plurality of RAIs according to an embodiment of the present disclosure.

Referring to FIG. 6, in an upload process which is based on an opportunistic upload scheme according to an embodiment of the present disclosure, a segment is used as a data unit used for uploading content, and a size of the segment may be fixed or variable. An operation of performing an upload process which is based on an opportunistic upload scheme as shown in FIG. 6 is an operation of performing an upload process which is based on an opportunistic upload scheme in a case that a size of a segment is variable. An operation of performing an upload process which is based on an opportunistic upload scheme as shown in FIG. 6 is an operation of performing an upload process in a case that a size of a segment is changed based on an additive increase scheme.

The STA determines whether a Wi-Fi scheme is available at operation 611. If the Wi-Fi scheme is available, the STA sets a value of a variable NUM_SUCCESS indicating the number of segments for which upload has been successful to an initial value, e.g., 1 (NUM_SUCCESS=1), and sets a value of a variable SEG_SIZE indicating a size of a segment to an initial value, e.g., X MB (SEG_SIZE=X MB) at operation 613.

The STA sets the value of the SEG_SIZE to a value generated by multiplying a current value of the SEG_SIZE and a current value of the NUM_SUCCESS (SEG_SIZE=SEG_SIZE×NUM_SUCCESS) at operation 615. The STA transmits an HTTP Range Request Header message and an HTTP Range Request Body message to a proxy server at operation 617. The HTTP Range Request Body includes a segment with a variable size, e.g., SEG_SIZE MB.

The STA determines whether an HTTP Range Response message as a response message to the HTTP Range Request Body message is received from the proxy server at operation 619. If the HTTP Range Request Body message is received from the proxy server, the STA determines whether upload for the content has been completed, that is, upload for all segments included in the content has been completed at operation 621.

If the upload for the content has not been completed, the STA increases the value of the NUM_SUCCESS by a preset value, e.g., 1 (NUM_SUCCESS=NUM_SUCCESS+1) at operation 623, and returns to operation 615.

If the HTTP Range Request Body message is not received from the proxy server, the STA determines whether a Wi-Fi connection is released at operation 625. If the Wi-Fi connection is released, the STA returns to operation 611. If the Wi-Fi connection is not released (i.e., if the Wi-Fi scheme is available), the STA returns to operation 619.

Although not shown in FIG. 6, as described in operation 625, if the Wi-Fi connection is released while the upload process for the content is performed (i.e., if the Wi-Fi scheme becomes unavailable), the STA stops the upload process for the content and waits until the Wi-Fi scheme becomes available again.

If reception of a corresponding segment of the content is not normally performed while the proxy server receives the corresponding segment of the content from the STA, e.g., if the upload for the corresponding segment is stopped, the proxy server does not store and may discard a corresponding segment which is received until corresponding time, i.e., a part of the corresponding segment. In this case, the STA may upload again from data corresponding to the start time of the corresponding segment for which the upload is stopped if the Wi-Fi scheme becomes available again.

Alternatively, if reception of a corresponding segment of the content is not normally performed while the proxy server receives the corresponding segment of the content from the STA, the proxy server may store a corresponding segment which is received until corresponding time, i.e., a part of the corresponding segment without discarding the part of the corresponding segment. In this case, the STA may upload again from data corresponding to start time of the corresponding segment for which the upload is stopped if the Wi-Fi scheme becomes available again. For example, if the Wi-Fi scheme becomes available again, the STA may acquire a size of data which is finally updated from the proxy server through Out-of-Band Signaling, and acquire upload start time for a corresponding segment based on the acquired size.

Although FIG. 6 illustrates an example of an operation of performing an upload process which is based on an opportunistic upload scheme using a variable-size segment in an STA in a communication system supporting a plurality of RAIs according to an embodiment of the present disclosure, various changes could be made to FIG. 6. For example, although shown as a series of operations, various operations in FIG. 6 could overlap, occur in parallel, occur in a different order, or occur multiple times.

An example of an operation of performing an upload process which is based on an opportunistic upload scheme using a variable-size segment in an STA in a communication system supporting a plurality of RAIs according to an embodiment of the present disclosure has been described with reference to FIG. 6, and an operation of determining a size of a segment based on an exponential growth scheme in an STA in a communication system supporting a plurality of RAIs according to an embodiment of the present disclosure will be described with reference to FIG. 7.

Figure 7:
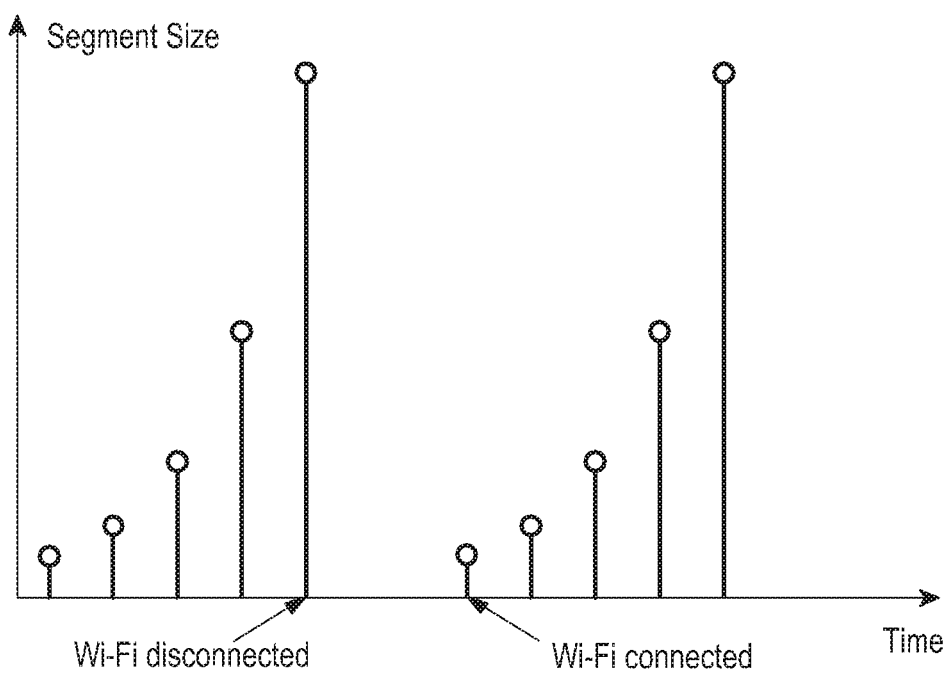
FIG. 7 schematically illustrates a process of determining a size of a segment based on an exponential growth scheme in an STA in a communication system supporting a plurality of RAIs according to an embodiment of the present disclosure.

FIG. 7 schematically illustrates a process of determining a size of a segment based on an exponential growth scheme in an STA in a communication system supporting a plurality of RAIs according to an embodiment of the present disclosure.

Referring to FIG. 7, the STA divides content to be uploaded on a segment basis and uploads the divided segments. In this case, the STA may variably determine a size of a segment, and one of schemes of determining the size of the segment is the exponential growth scheme.

The exponential growth scheme is a scheme of increasing a size of a segment by a preset multiple, e.g., twice compared to a currently set size. In a case that the exponential growth is applied, a size of a segment is continuously increased twice (i.e., doubled) until the STA stops uploading, e.g., until a Wi-Fi scheme becomes unavailable. A maximum size of the segment is predetermined, and the maximum size may be adaptively set based on a system situation of the communication system. Accordingly, the size of the segment is continuously increased twice, however, the increased size of the segment may not be greater than the maximum size.

If the Wi-Fi scheme becomes unavailable, the STA stops an upload process. In this case, a size of a segment is set to an initial size again. If the Wi-Fi scheme becomes available again, the STA start uploading a segment based on the initial size.

A process of determining a size of a segment based on an exponential growth scheme in an STA in a communication system supporting a plurality of RAIs according to an embodiment of the present disclosure has been described with reference to FIG. 7, and another example of an operation of performing an upload process which is based on an opportunistic upload scheme using a variable-size segment in an STA in a communication system supporting a plurality of RAIs according to an embodiment of the present disclosure will be described with reference to FIG. 8.

Figure 8:
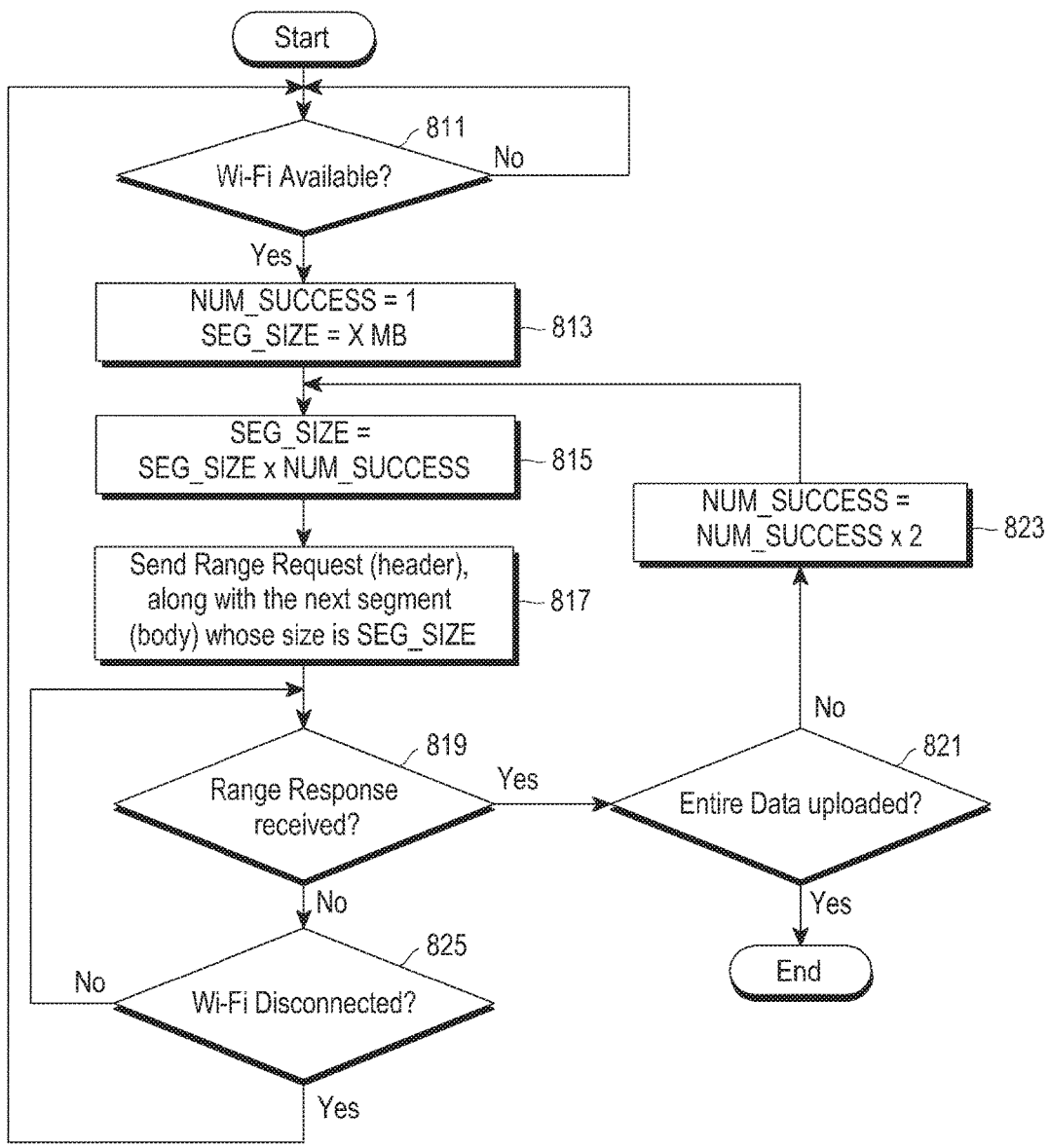
FIG. 8 schematically illustrates another example of an operation of performing an upload process which is based on an opportunistic upload scheme using a variable-size segment in an STA in a communication system supporting a plurality of RAIs according to an embodiment of the present disclosure.

FIG. 8 schematically illustrates another example of an operation of performing an upload process which is based on an opportunistic upload scheme using a variable-size segment in an STA in a communication system supporting a plurality of RAIs according to an embodiment of the present disclosure.

Referring to FIG. 8, in an upload process which is based on an opportunistic upload scheme according to an embodiment of the present disclosure, a segment is used as a data unit used for uploading content, and a size of the segment may be fixed or variable. An operation of performing an upload process which is based on an opportunistic upload scheme as shown in FIG. 8 is an operation of performing an upload process which is based on an opportunistic upload scheme in a case that a size of a segment is variable. An operation of performing an upload process which is based on an opportunistic upload scheme as shown in FIG. 8 is an operation of performing an upload process in a case that a size of a segment is changed based on an exponential growth scheme.

The STA determines whether a Wi-Fi scheme is available at operation 811. If the Wi-Fi scheme is available, the STA sets a value of a variable NUM_SUCCESS indicating the number of segments for which upload has been successful to an initial value, e.g., 1 (NUM_SUCCESS=1), and sets a value of a variable SEG_SIZE indicating a size of a segment to an initial value, e.g., X MB (SEG_SIZE=X MB) at operation 813.

The STA sets the value of the SEG_SIZE to a value generated by multiplying a current value of the SEG_SIZE and a current value of the NUM_SUCCESS (SEG_SIZE=SEG_SIZE×NUM_SUCCESS) at operation 815. The STA transmits an HTTP Range Request Header message and an HTTP Range Request Body message to a proxy server at operation 817. The HTTP Range Request Body includes a segment with a variable size, e.g., SEG_SIZE MB.

The STA determines whether an HTTP Range Response message as a response message to the HTTP Range Request Body message is received from the proxy server at operation 819. If the HTTP Range Request Body message is received from the proxy server, the STA determines whether upload for the content has been completed (i.e., upload for all segments included in the content has been completed) at operation 821.

If the upload for the content has not been completed, the STA increases the value of the NUM_SUCCESS by a preset multiple, e.g., twice (NUM_SUCCESS=NUM_SUCCESS×2) at operation 823, and returns to operation 815.

If the HTTP Range Request Body message is not received from the proxy server, the STA determines whether a Wi-Fi connection is released at operation 825. If the Wi-Fi connection is released, the STA returns to operation 811. If the Wi-Fi connection is not released, that is, if the Wi-Fi scheme is available, the STA returns to operation 819.

Although not shown in FIG. 8, as described in operation 825, if the Wi-Fi connection is released while the upload process for the content is performed, that is, if the Wi-Fi scheme becomes unavailable, the STA stops the upload process for the content and waits until the Wi-Fi scheme becomes available again.

If reception of a corresponding segment of the contents is not normally performed while the proxy server receives the corresponding segment of the content from the STA, e.g., if the upload for the corresponding segment is stopped, the proxy server does not store and may discard a corresponding segment which is received until corresponding time, i.e., a part of the corresponding segment. In this case, the STA may upload again from data corresponding to start time of the corresponding segment for which the upload is stopped if the Wi-Fi scheme becomes available again.

Alternatively, if reception of a corresponding segment of the content is not normally performed while the proxy server receives the corresponding segment of the content from the STA, the proxy server may store a corresponding segment which is received until corresponding time, i.e., a part of the corresponding segment without discarding the part of the corresponding segment. In this case, the STA may upload again from data corresponding to start time of the corresponding segment for which the upload is stopped if the Wi-Fi scheme becomes available again. For example, if the Wi-Fi scheme becomes available again, the STA may acquire a size of data which is finally updated from the proxy server through Out-of-Band Signaling, and acquire upload start time for a corresponding segment based on the acquired size.

Although FIG. 8 illustrates another example of an operation of performing an upload process which is based on an opportunistic upload scheme using a variable-size segment in an STA in a communication system supporting a plurality of RAIs according to an embodiment of the present disclosure, various changes could be made to FIG. 8. For example, although shown as a series of operations, various operations in FIG. 8 could overlap, occur in parallel, occur in a different order, or occur multiple times.

Another example of an operation of performing an upload process which is based on an opportunistic upload scheme using a variable-size segment in an STA in a communication system supporting a plurality of RAIs according to an embodiment of the present disclosure has been described with reference to FIG. 8, and another example of an upload process which is based on an opportunistic upload scheme in a communication system supporting a plurality of RAIs according to an embodiment of the present disclosure will be described with reference to FIG. 9.

Figure 9:
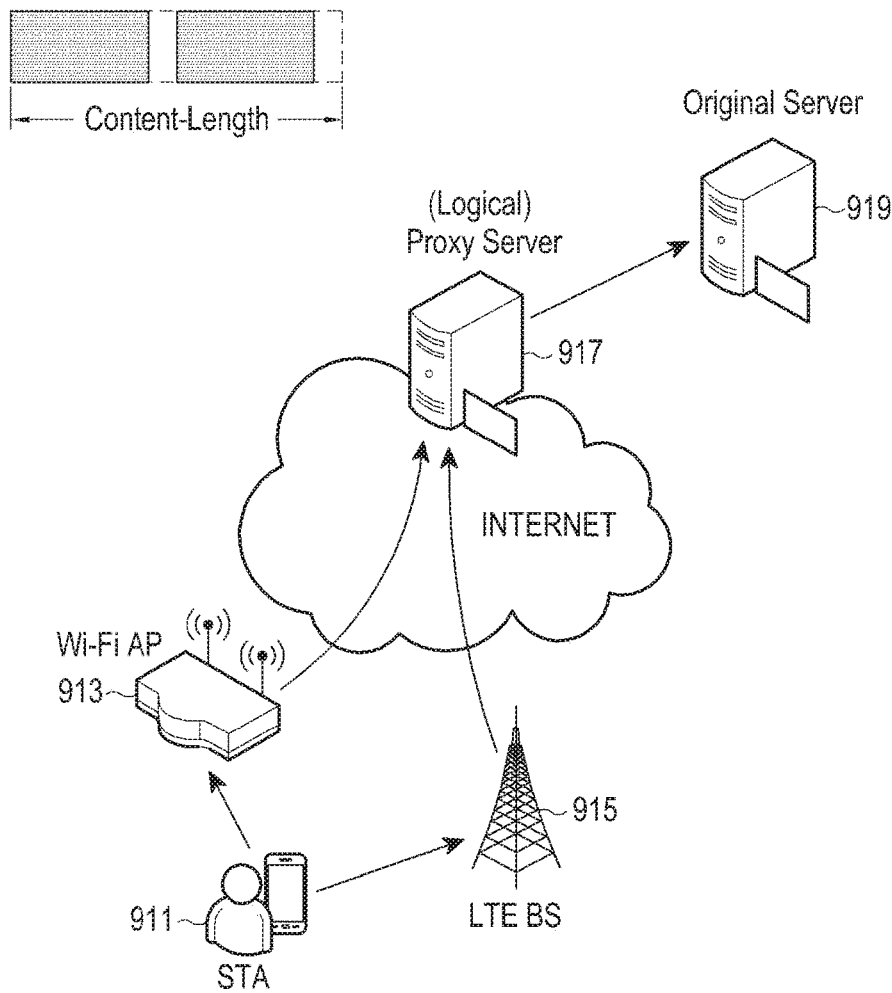
FIG. 9 schematically illustrates another example of an upload process which is based on an opportunistic upload scheme in a communication system supporting a plurality of RAIs according to an embodiment of the present disclosure.

FIG. 9 schematically illustrates another example of an upload process which is based on an opportunistic upload scheme in a communication system supporting a plurality of RAIs according to an embodiment of the present disclosure.

Referring to FIG. 9, the upload process which is based on the opportunistic upload scheme in FIG. 9 is an upload process in a case that a plurality of preset RAIs, e.g., a Wi-Fi scheme and an LTE scheme are used. In FIG. 9, for convenience, it will be assumed that a Wi-Fi connection is used as a WLAN connection, and an LTE connection is used as a wireless wide area network (WWAN) connection.

In FIG. 9, an upload object is content, however, the upload object may be various forms such as a file, a service package, and/or the like as well as the content.

The communication system includes an STA 911, a Wi-Fi AP 913, an LTE BS 915, a proxy server 917, and an original server 919. The proxy server 917 is a logical server.

Upon detecting that there is content to be uploaded, the STA 911 allocates a session ID for an upload session. In FIG. 9, for example, it will be assumed that the session ID for the upload session is "cloud.example.org:j6oAOxCWZh/CD723LGeXlf".

The STA 911 starts uploading the content to the proxy server 917 using a message, e.g., an HTTP Range Request Header message, including an IP address of a destination to which the STA 911 will upload the content, i.e., an IP address of a final server to which the STA 911 will upload the content, e.g., an IP address of the original server 919 and information related to a content-length of the content to be uploaded. The HTTP Request Header message includes a destination IP address, a session ID, information related to a content-length, and information related to a range of content. Unlike an upload process as described in FIG. 1, the STA 911 uploads content using a plurality of RAIs, i.e., a Wi-Fi scheme and an LTE scheme.

After receiving the HTTP Request Header message from the STA 911, the proxy server 917 receives content from the STA 911 while detecting and maintaining session information about the STA 911 including the session ID included in the Request Header message, and monitors a content upload state of the STA 911. Upon detecting that content upload from the STA 911 has been completed while receiving the content from the STA 911, the proxy server 917 uploads the content for which the upload has been completed to the original server 919.

A case that the STA 911 uploads the content to the original server 121 without a log-in process for the original server 919 has been described above. However, the STA 911 may upload the content after performing the log-in process for the original server 919, and this will be described below.

If there is a need for a log-in process for using a service provided by the original server 919, the STA 911 may include user account information into an HTTP Request Header field. Whether there is a need for the log-in process is determined by the STA 911, and the STA 911 includes the user account information of the STA 911 into the HTTP Request Header field if there is a need for the log-in process. The user account information of the STA 911 may be included into all HTTP Range Request messages, or a specific HTTP Range Request message, e.g., the first HTTP Range Request message or the last HTTP Range Request message.

If the user account information is included in the HTTP Range Request Header message received from the STA 911, the proxy server 917 performs a log-in process for the original server 919 based on the user account information when the content upload from the STA 911 has been completed.

In a case that content is to be uploaded as described in FIG. 9, even though it is impossible for an STA to upload content based on a Wi-Fi scheme while uploading the content based on the Wi-Fi scheme, the STA uploads remaining data except for the uploaded data among the content using an LTE scheme without uploading the content again from the beginning, so retransmission overhead may be decreased.

In a case that content are to be uploaded as described in FIG. 9, an STA may upload content in a background form using a Wi-Fi scheme whenever it is possible to use a Wi-Fi scheme, i.e., whenever a Wi-Fi connection is established without the user's intervention, and may upload content using an LTE scheme if a Wi-Fi connection is not established. Accordingly, content upload which is based on this opportunistic upload scheme increases user's convenience.

A case that an STA uploads content based on a Wi-Fi scheme if the Wi-Fi scheme is available, and uploads content based on an LTE scheme if the Wi-Fi scheme is unavailable has been described above. However, an STA may upload content in parallel using an LTE scheme as well as a Wi-Fi scheme if the Wi-Fi scheme is available (i.e., the STA may upload the content in parallel using two connections). In this way, if an STA uploads content using connections using different RAIs, an upload speed may be increased and upload stability may be enhanced.

Another example of an upload process which is based on an opportunistic upload scheme in a communication system supporting a plurality of RAIs according to an embodiment of the present disclosure has been described with reference to FIG. 9, and another example of a message transmitting/receiving process according to an upload process which is based on an opportunistic upload scheme in a communication system supporting a plurality of RAIs according to an embodiment of the present disclosure will be described with reference to FIGS. 10A and 10B.

Figure 10A:
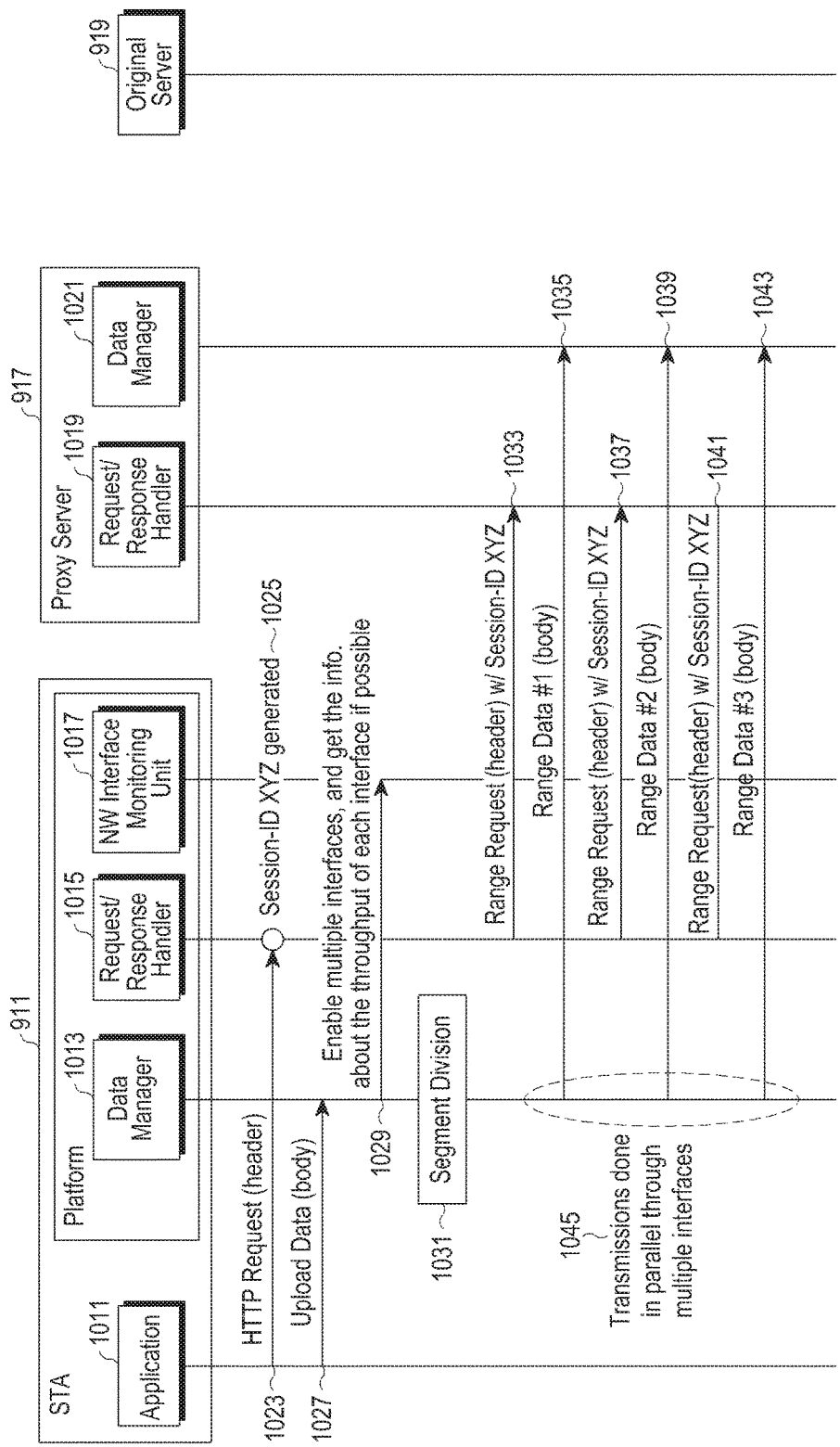
FIGS. 10A and 10B schematically illustrate another example of a message transmitting/receiving process according to an upload process which is based on an opportunistic upload scheme in a communication system supporting a plurality of RAIs according to an embodiment of the present disclosure.
Figure 10B:
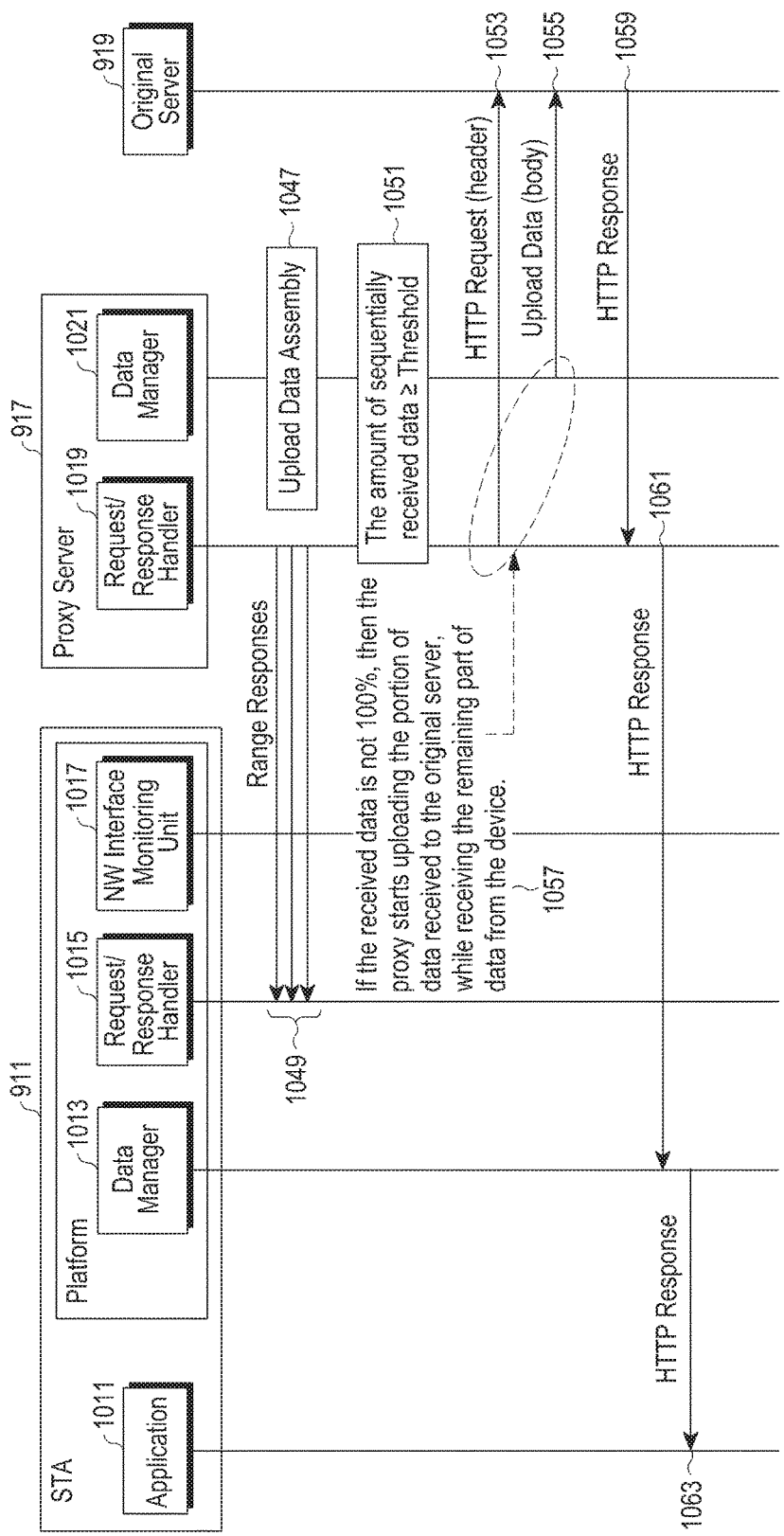

FIGS. 10A and 10B schematically illustrate another example of a message transmitting/receiving process according to an upload process which is based on an opportunistic upload scheme in a communication system supporting a plurality of RAIs according to an embodiment of the present disclosure.

Referring to FIGS. 10A and 10B, the communication system includes an STA 911, a proxy server 917, and an original server 919.

The STA 911 includes an application 1011 and a platform, and the platform includes a data manager 1013, a request/response handler 1015, and a network I/F monitoring unit 1017.

The proxy server 917 includes a request/response handler 1019 and a data manager 1021.

Upon detecting that content to be uploaded occurs, the application 1011 of the STA 911 delivers an HTTP Request Header message including information indicating that there is content to be uploaded to the request/response handler 1015 of the STA 911 at operation 1023. Upon receiving the HTTP Request Header message, the request/response handler 1015 of the STA 911 generates a session ID for a session used for uploading content of the STA 911 based on the HTTP Request Header message at operation 1025. In FIGS. 10A and 10B, it will be assumed that the session ID is "XYZ".

The application 1011 of the STA 911 delivers data to be uploaded to the data manager 1013 of the STA 911 through an HTTP Request Body message at operation 1027.

After receiving the HTTP Request Body message, the data manager 1013 of the STA 911 detects RAIs which are available at current time, and throughput of each of the RAIs available at the current time at operation 1029. The data manager 1013 of the STA 911 performs a segment dividing operation based on the throughput of each of the RAIs available at the current time at operation 1031.

The segment dividing operation will be described below. The content is divided on a segment basis. In FIGS. 10A and 10B, the content is uploaded in parallel based on a plurality of RAIs, not one RAI, so a size of a segment needs to be determined by considering each RAI. For example, the size of the segment may be determined based on a bandwidth of each RAI and a network speed, and this will be described below.

First, a size of a segment may be determined in order that the size of the segment is proportional to an available bandwidth of each RAI and a network speed.

If there are a plurality of RAIs available at the current time, the data manager 1013 of the STA 911 may transmit initial segments including a first segment of the content through a RAI with the highest network speed among the plurality of available RAIs.

After the segment upload through the one of the plurality of RAIs has been completed, the data manager 1013 of the STA 911 may upload a segment which follows the segment for which the upload has been completed.

If an HTTP Range Request Header message indicating a range overlapped in the same upload session is received, the proxy server 917 records the overlapped range. If a segment corresponding to the overlapped range is received, the proxy server 917 may notify the STA 911 of information indicating that the segment corresponding to the overlapped range has been uploaded already through an HTTP Range Response message to stop upload the segment.

A case that a size of a segment may be determined in order that the size of the segment is proportional to an available bandwidth of each RAI and a network speed has been described above. However, a size of a segment may be determined as a fixed size, and this will be described below.

If there are a plurality of RAIs available at current time, the data manager 1013 of the STA 911 divides content to be uploaded based on fixed-size content basis.

After the segment upload through the one of the plurality of RAIs has been completed, the data manager 1013 of the STA 911 may upload another segment which is not uploaded through other RAIs.

If time required for transmitting a segment in one RAI among the plurality of RAIs is longer than preset threshold upload time due to various reasons such as stopping of a network operation, performance degradation, and/or the like, the data manager 1013 of the STA 911 may upload the segment through other RAI without uploading the segment through the one RAI.

If it is impossible for the one RAI to perform an upload operation during time longer than preset threshold time, the data manager 1013 of the STA 911 may upload data which is not transmitted through the one RAI and waits for upload through one HTTP Range Request Body message without dividing the data into segments.

The request/response handler 1015 of the STA 911 transmits an HTTP Range Request Header message to the request/response handler 1019 of the proxy server 917 at operation 1033. The HTTP Range Request Header message includes the HTTP Request Header message received from the application 1011 of the STA 911 and the generated session ID, i.e., XYZ. The data manager 1013 of the STA 911 transmits a segment of a corresponding range, e.g., a data #1 to the data manager 1021 of the proxy server 917 through an HTTP Range Request Body message at operation 1035.

Since the upload of the content has not been completed, the request/response handler 1015 of the STA 911 transmits an HTTP Range Request Header message to the request/response handler 1019 of the proxy server 917 at operation 1037. The HTTP Range Request Header message includes the HTTP Request Header message received from the application 1011 of the STA 911 and the session ID XYZ. The data manager 1013 of the STA 911 transmits a segment of a corresponding range, e.g., data #2 to the data manager 1021 of the proxy server 917 through an HTTP Range Request Body message at operation 1039.

Meanwhile, the upload for the content has not been completed, so the request/response handler 1015 of the STA 911 transmits an HTTP Range Request Header message to the request/response handler 1019 of the proxy server 917 at operation 1041. The HTTP Range Request Header message includes the HTTP Request Header message received from the application 1011 of the STA 911 and the session ID XYZ. The data manager 1013 of the STA 911 transmits a segment of a corresponding range, e.g., data #3 to the data manager 1021 of the proxy server 917 through an HTTP Range Request Body message at operation 1043.

After the data manager 1013 of the STA 911 uploads the segments in parallel through the plurality of RAIs at operation 1045, the data manager 1021 of the proxy server 917 assembles the segments received through the HTTP Range Request Body message, i.e., the segments uploaded by the STA 911 at operation 1047. The request/response handler 1019 of the proxy server 917 transmits HTTP Range Response messages to the request/response handler 1015 of the STA 111 at operation 1049. The HTTP Range Response messaged transmitted at operation 1049 are response messages to the HTTP Range Request Header messages received at operations 1035, 1039, and 1043.

The data manager 1021 of the proxy server 917 detects that amount of the received data is greater than or equal to preset threshold data amount at operation 1051. The request/response handler 1019 of the proxy server 917 transmits an HTTP Request Header message to the original server 919 in order to upload the received data, i.e., the content to the original server 919 at operation 1053. The HTTP Request Header message transmitted at operation 1053 is the same as the HTTP Request Header message transmitted at operation 1023.

The data manager 1021 of the proxy server 917 uploads the content received from the STA 911 to the original server 919 through an HTTP Request Body message at operation 1055.

Even though the amount of the received data is not 100%, the proxy server 917 starts uploading a part of the received data to the original server 919 while receiving other segments of the content at operation 1057.

Upon receiving the HTTP Request Body message from the data manager 1021 of the proxy server 917, the original server 919 transmits an HTTP Response message to the request/response handler 1019 of the proxy server 917 at operation 1059. Upon receiving the HTTP Response message from the original server 919, the request/response handler 1019 of the proxy server 917 transmits an HTTP Response message to the request/response handler 1015 of the STA 911 at operation 1061. Upon receiving the HTTP Response message from the request/response handler 1019 of the proxy server 917, the request/response handler 1015 of the STA 911 delivers an HTTP Response message to the application 1011 of the STA 911 at operation 1063.

Upon receiving the HTTP Response message from the request/response handler 1015 of the STA 911, the application 1011 of the STA 911 may detect that the content upload to the original server 919 has been completed.

Although FIGS. 10A and 10B illustrate another example of a message transmitting/receiving process according to an upload process which is based on an opportunistic upload scheme in a communication system supporting a plurality of RAIs according to an embodiment of the present disclosure, various changes could be made to FIGS. 10A and 10B. For example, although shown as a series of operations, various operations in FIGS. 10A and 10B could overlap, occur in parallel, occur in a different order, or occur multiple times.

Another example of a message transmitting/receiving process according to an upload process which is based on an opportunistic upload scheme in a communication system supporting a plurality of RAIs according to an embodiment of the present disclosure has been described with reference to FIGS. 10A and 10B, and another example of a message transmitting/receiving process according to an upload process which is based on an opportunistic upload scheme in a communication system supporting a plurality of RAIs according to an embodiment of the present disclosure will be described with reference to FIGS. 11A and 11B.

Figure 11A:
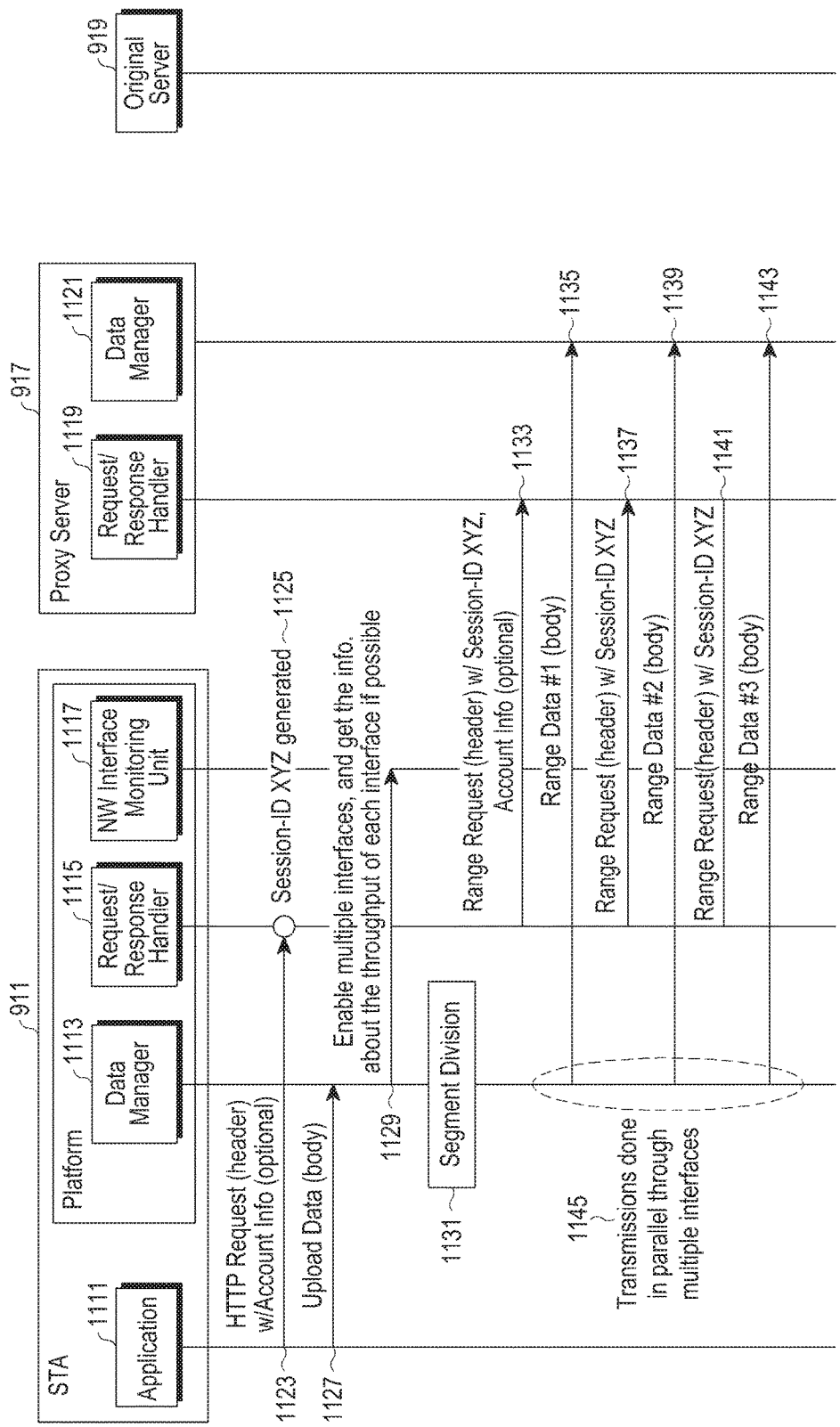
FIGS. 11A and 11B schematically illustrate another example of a message transmitting/receiving process according to an upload process which is based on an opportunistic upload scheme in a communication system supporting a plurality of RAIs according to an embodiment of the present disclosure.
Figure 11B:
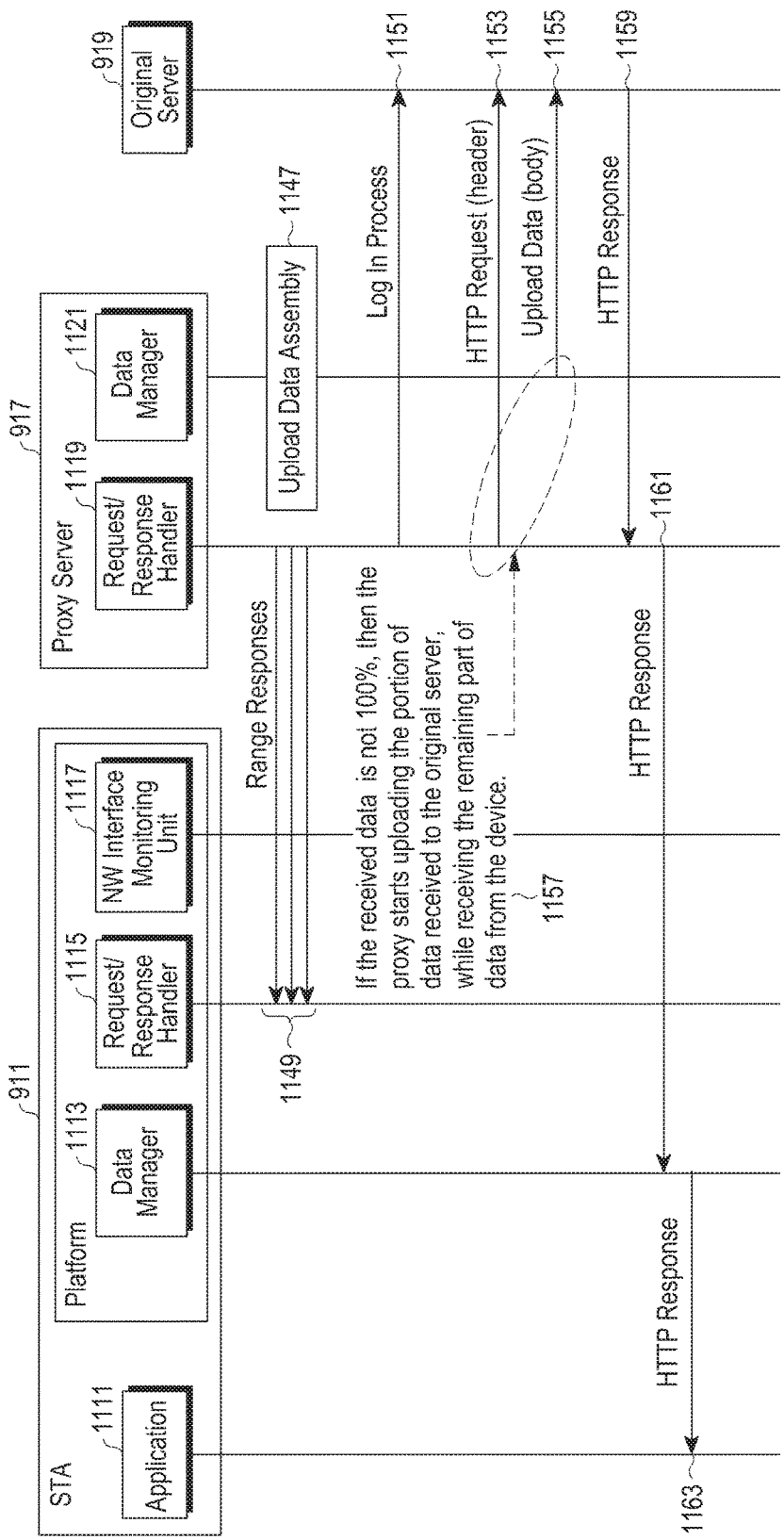

FIGS. 11A and 11B schematically illustrate another example of a message transmitting/receiving process according to an upload process which is based on an opportunistic upload scheme in a communication system supporting a plurality of RAIs according to an embodiment of the present disclosure.

Referring to FIGS. 11A and 11B, a message transmitting/receiving process according to an upload process which is based on an opportunistic upload scheme in FIGS. 11A and 11B is the same as a message transmitting/receiving process according to an upload process which is based on an opportunistic upload scheme in FIGS. 10A and 10B except that a log-in process is additionally performed.

The communication system includes an STA 911, a proxy server 917, and an original server 919.

The STA 911 includes an application 1111 and a platform, and the platform includes a data manager 1113, a request/response handler 1115, and a network I/F monitoring unit 1117.

The proxy server 917 includes a request/response handler 1119 and a data manager 1121.

As described above, in the message transmitting/receiving process according to the upload process which is based on the opportunistic upload scheme in FIGS. 11A and 11B, the log-in process is additionally performed compared to the message transmitting/receiving process according to the upload process which is based on the opportunistic upload scheme in FIGS. 10A and 10B, so the application 1111 of the STA 911 delivers an HTTP Request Header message including information indicating that there is content to be uploaded and user account information of the STA 911 to the request/response handler 1115 of the STA 911 upon detecting that the content to be uploaded occurs at operation 1123. Upon receiving the HTTP Request Header message, the request/response handler 1115 of the STA 911 generates a session ID of a session used for uploading content of the STA 911 based on the HTTP Request Header message at operation 1125. In FIGS. 11A and 11B, it will be assumed that the session ID is XYZ.

The application 1111 of the STA 911 delivers data to be uploaded to the data manager 1113 of the STA 911 through an HTTP Request Body message at operation 1127.

After receiving the HTTP Request Body message, the data manager 1113 of the STA 911 detects RAIs available at current time and throughput of each of the RAIs available at the current time at operation 1129. The data manager 1113 of the STA 911 performs a segment dividing operation based on the throughput of each of the RAIs available at the current time at operation 1131. The segment dividing operation has been described with FIGS. 10A and 10B, and a detailed description thereof will be omitted herein.

The request/response handler 1115 of the STA 911 transmits an HTTP Range Request Header message to the request/response handler 1119 of the proxy server 917 at operation 1133. The HTTP Range Request Header message includes the HTTP Request Header message received from the application 1111 of the STA 911, the generated session ID, i.e., XYZ, and the user account information of the STA 911.

Operations thereafter, i.e., operations 1135 to 1149 are the same as operations 1035 to 1049 as described in FIGS. 10A and 10B, so a detailed description thereof will be omitted herein.

After transmitting the HTTP Range Response messages to the request/response handler 1115 of the STA 911, the request/response handler 1119 of the proxy server 917 needs to upload the content received from the STA 911, i.e., the content for which upload has been completed to the original server 919. Accordingly, the request/response handler 1119 of the proxy server 917 performs a log-in process with the original server 919. The request/response handler 1119 of the proxy server 917 performs the log-in process with the original server 919 based on the user account information received from the request/response handler 1115 of the STA 911 at operation 1133 at operation 1151. The log-in process which is based on the user account information may be implemented with various forms, and a detailed description thereof will be omitted herein.

After performing the log-in process, the request/response handler 1119 of the proxy server 917 transmits an HTTP Request Header message to the original server 919 if the log-in process is successful at operation 1153.

Operations thereafter, i.e., operations 1155 to 1163 are the same as operations 1055 to 1063 as described in FIGS. 10A and 10B, so a detailed description thereof will be omitted herein.

Although FIGS. 11A and 11B illustrate another example of a message transmitting/receiving process according to an upload process which is based on an opportunistic upload scheme in a communication system supporting a plurality of RAIs according to an embodiment of the present disclosure, various changes could be made to FIGS. 11A and 11B. For example, although shown as a series of operations, various operations in FIGS. 11A and 11B could overlap, occur in parallel, occur in a different order, or occur multiple times.

Another example of a message transmitting/receiving process according to an upload process which is based on an opportunistic upload scheme in a communication system supporting a plurality of RAIs according to an embodiment of the present disclosure has been described with reference to FIGS. 11A and 11B, and an example of implementation of a message transmitting/receiving process according to an upload process which is based on an opportunistic upload scheme in a communication system supporting a plurality of RAIs according to an embodiment of the present disclosure will be described with reference to FIGS. 12A and 12B.

Figure 12A:
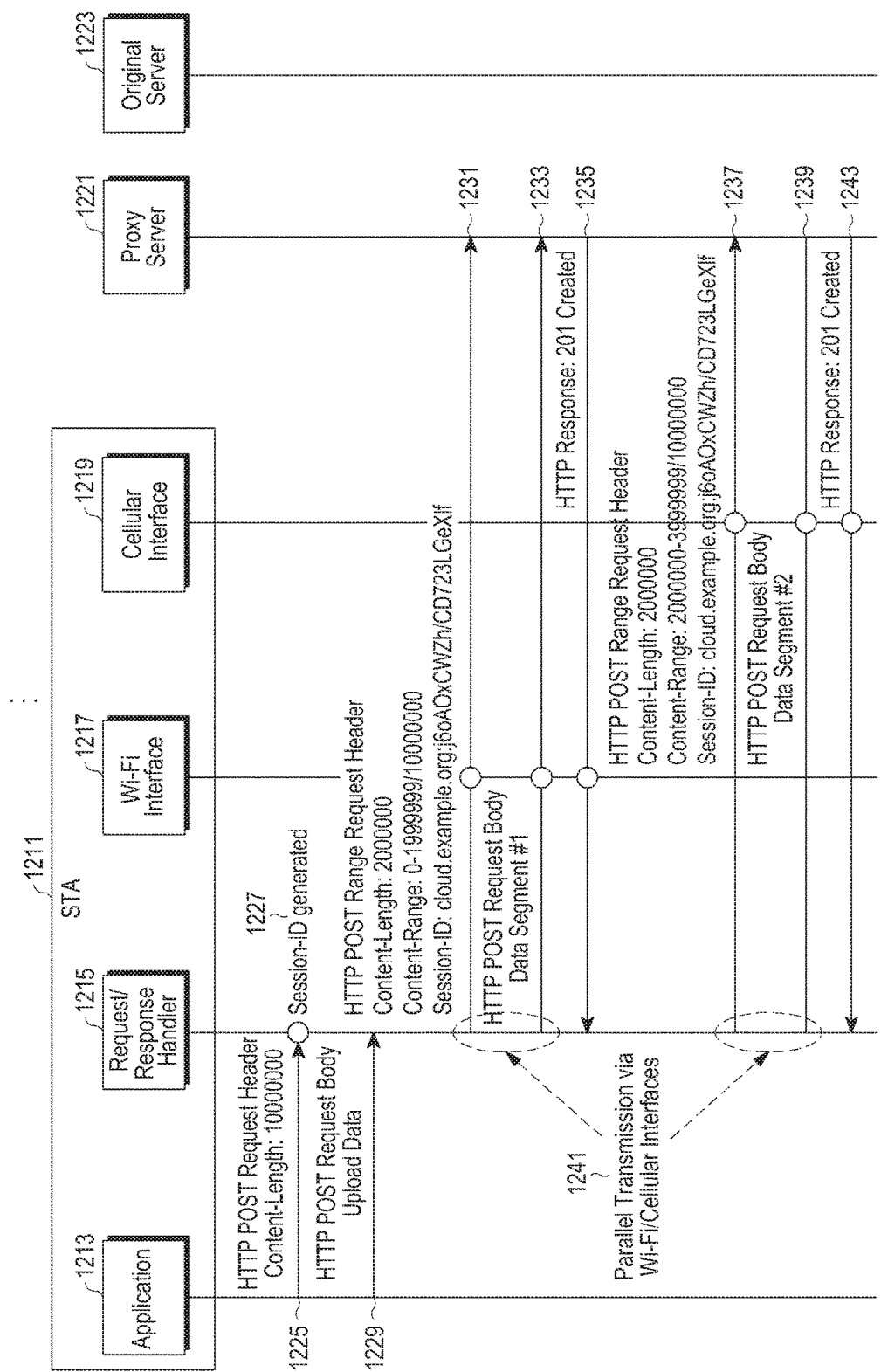
FIGS. 12A and 12B schematically illustrate an example of implementation of a message transmitting/receiving process according to an upload process which is based on an opportunistic upload scheme in a communication system supporting a plurality of RAIs according to an embodiment of the present disclosure.
Figure 12B:
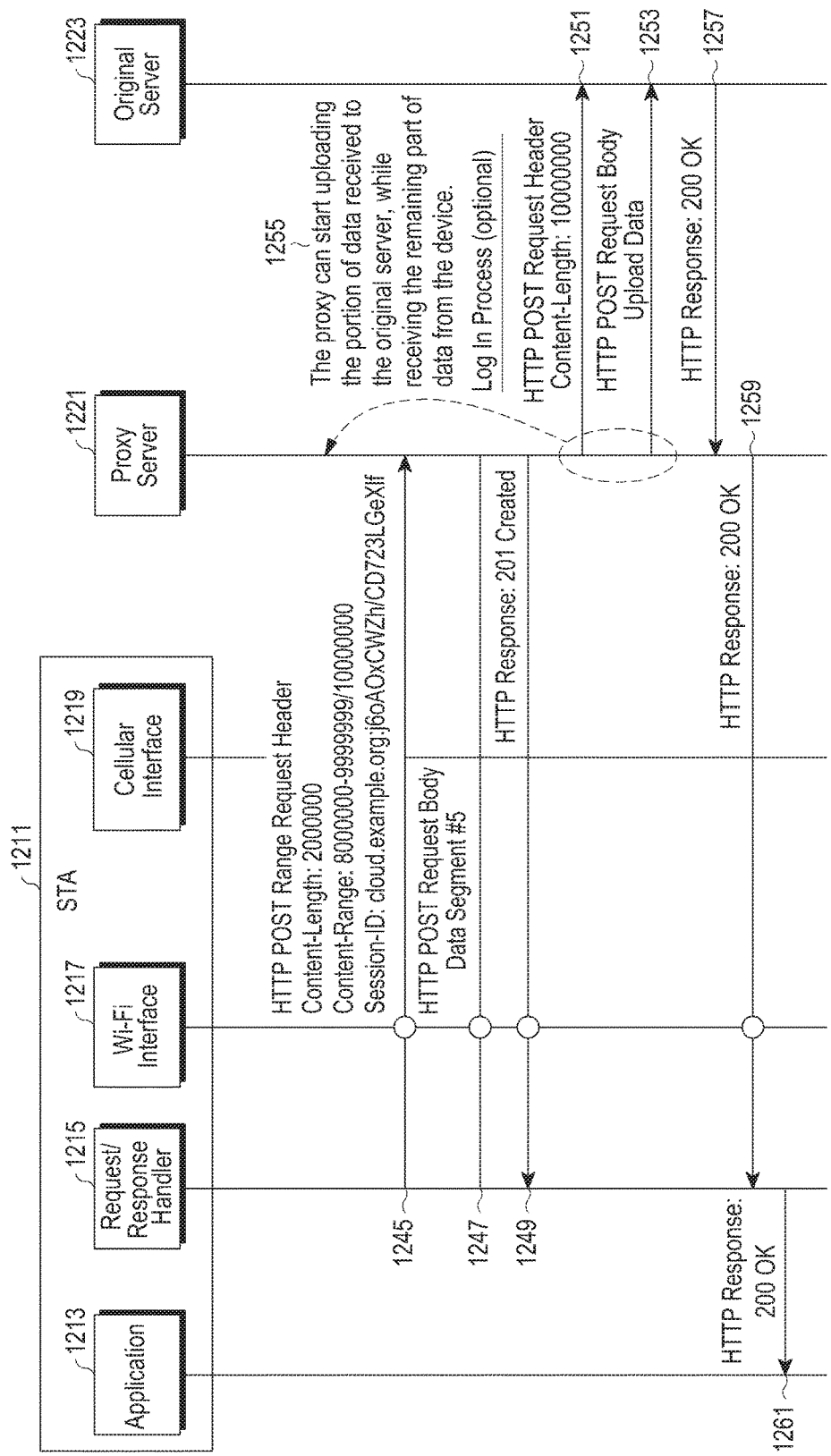

FIGS. 12A and 12B schematically illustrate an example of implementation of a message transmitting/receiving process according to an upload process which is based on an opportunistic upload scheme in a communication system supporting a plurality of RAIs according to an embodiment of the present disclosure.

Referring to FIGS. 12A and 12B, the communication system includes an STA 1211, a proxy server 1221, and an original server 1223.

The STA 1211 includes an application 1213, a request/response handler 1215, a Wi-Fi I/F 1217, and a cellular I/F 1219. The cellular I/F may be an LTE I/F.

Upon detecting that content to be uploaded occurs, the application 1213 of the STA 1211 delivers an HTTP POST Request Header message including information indicating that there is content to be uploaded to the request/response handler 1215 of the STA 1211 at operation 1225. The HTTP POST Request Header message includes Content-Length indicating a length of the content, and a value of the Content-Length is set to 10000000. After receiving the HTTP POST Request Header message, the request/response handler 1215 of the STA 1211 generates a session ID for a session used for uploading content of the STA 1211 based on the HTTP POST Request Header message at operation 1227. In FIGS. 12A and 12B, it will be assumed that the session ID is "cloud.example.org:j6oAOxCWZh/CD723LGeXlf".

The application 1213 of the STA 1211 delivers data to be uploaded to the request/response handler 1215 of the STA 1211 through an HTTP POST Request Body message at operation 1229. After receiving the HTTP POST Request Body message from the application 1213 of the STA 1211, the request/response handler 1215 of the STA 1211 transmits an HTTP POST Request Header message to the proxy server 1221 at operation 1231. The HTTP POST Request Header message includes Content-Length indicating a length of segments included in the content, Content-Range indicating a range of a corresponding segment, and Session-ID indicating a session ID. A value of the Content-Length is set to "2000000", a value of the Content-Range is set to "0-1999999/10000000", and the Session-ID is set to "cloud.example.org:j6oAOxCWZh/CD723LGeXlf".

The request/response handler 1215 of the STA 1211 transmits an HTTP POST Request Body message to the proxy server 1221 at operation 1233. The HTTP POST Request Body message includes a segment #1. After receiving the HTTP POST Request Body message from the request/response handler 1215 of the STA 1211, the proxy server 1221 transmits an HTTP Response: 201 Created message as a response message to the HTTP POST Request Header message to the request/response handler 1215 of the STA 1211 at operation 1235.

Meanwhile, the upload of the content has not been completed, so the request/response handler 1215 of the STA 1211 transmits an HTTP POST Request Header message to the proxy server 1221 at operation 1237. The HTTP POST Request Header message includes Content-Length, Content-Range, and Session-ID. A value of the Content-Length is set to "2000000", a value of the Content-Range is set to "2000000-3999999/10000000", and the Session-ID is set to "cloud.example.org:j6oAOxCWZh/CD723LGeXlf".

The request/response handler 1215 of the STA 1211 transmits an HTTP POST Request Body message to the proxy server 1221 at operation 1239. The HTTP POST Request Body message includes a segment #2. After receiving the HTTP POST Request Body message from the request/response handler 1215 of the STA 1211, the proxy server 1221 transmits an HTTP Response: 201 Created message as a response message to the HTTP POST Request Header message to the request/response handler 1215 of the STA 1211 at operation 1243.

In this way, upload of segments included in the content is performed, and upload of a segment #5 as the last segment is performed. That is, the request/response handler 1215 of the STA 1211 transmits an HTTP POST Request Header message to the proxy server 1221 at operation 1245. The HTTP POST Request Header message includes Content-Length, Content-Range, and Session-ID. A value of the Content-Length is set to "2000000", a value of the Content-Range is set to "8000000-9999999/10000000", and the Session-ID is set to "cloud.example.org:j6oAOxCWZh/CD723LGeXlf".

The request/response handler 1215 of the STA 1211 transmits an HTTP POST Request Body message to the proxy server 1221 at operation 1247. The HTTP POST Request Body message includes a segment #5. After receiving the HTTP POST Request Body message from the request/response handler 1215 of the STA 1211, the proxy server 1221 transmits an HTTP Response: 201 Created message as a response message to the HTTP POST Request Header message to the request/response handler 1215 of the STA 1211 at operation 1249.

As described above, in FIGS. 12A and 12B, it will be understood that content may be uploaded in parallel through a plurality of RAIs, e.g., two RAIs, e.g., the Wi-Fi I/F 1217 and the cellular I/F 1219 at operation 1241.

After transmitting the HTTP Response: 201 Created message to the request/response handler 1215 of the STA 1211, the proxy server 1221 needs to upload the content received from the STA 1211 to the original server 1223. Accordingly, the proxy server 1221 performs a log-in process with the original server 1223. The proxy server 1221 may acquire user account information through the HTTP POST Request Header message transmitted at operation 1225, and performs the log-in process with the original server 1223 based on the user account information acquired through the HTTP POST Request Header message. The log-in process is optional, so the log-in process may be omitted.

After performing the log-in process, the proxy server 1221 transmits an HTTP POST Request Header message to the original server 1223 if the log-in process is successful at operation 1251. The HTTP POST Request Header message is the same as the HTTP POST Request Header message at operation 1225. The proxy server 1221 transmits an HTTP POST Request Body message to the original server 1223 at operation 1253. Here, the HTTP POST Request Body message includes content which are uploaded by the STA 1211. The proxy server 1221 may start uploading a part of received data to the original server 1223 while receiving other segments of the content from the STA 1211 at operation 1255.

After receiving the HTTP POST Request Body message from the proxy server 1221, the original server 1223 transmits an HTTP Response: 200 OK message as a response message to the HTTP POST Request Header message to the proxy server 1221 at operation 1257. After receiving the HTTP Response: 200 OK message from the original server 1223, the proxy server 1221 transmits an HTTP Response: 200 OK message to the request/response handler 1215 of the STA 1211 at operation 1259. After receiving the HTTP Response: 200 OK message from the proxy server 1221, the request/response handler 1215 of the STA 1211 transmits an HTTP Response: 200 OK message to the application 1213 of the STA 1211 at operation 1261.

Although FIGS. 12A and 12B illustrate an example of implementation of a message transmitting/receiving process according to an upload process which is based on an opportunistic upload scheme in a communication system supporting a plurality of RAIs according to an embodiment of the present disclosure, various changes could be made to FIGS. 12A and 12B. For example, although shown as a series of operations, various operations in FIGS. 12A and 12B could overlap, occur in parallel, occur in a different order, or occur multiple times.

An example of implementation of a message transmitting/receiving process according to an upload process which is based on an opportunistic upload scheme in a communication system supporting a plurality of RAIs according to an embodiment of the present disclosure has been described with reference to FIGS. 12A and 12B, and an inner structure of an STA in a communication system supporting a plurality of RAIs according to an embodiment of the present disclosure will be described with reference to FIG. 13.

Figure 13:
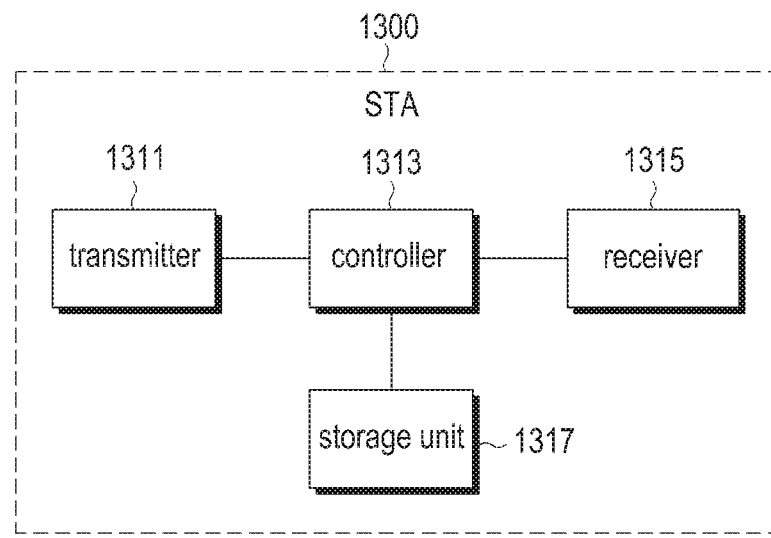
FIG. 13 schematically illustrates an inner structure of an STA in a communication system supporting a plurality of RAIs according to an embodiment of the present disclosure.

FIG. 13 schematically illustrates an inner structure of an STA in a communication system supporting a plurality of RAIs according to an embodiment of the present disclosure.

Referring to FIG. 13, an STA 1300 includes a transmitter 1311, a controller 1313, a receiver 1315, and a storage unit 1317.

The controller 1313 controls the overall operation of the STA 1300. The controller 1313 controls an operation related to an operation of performing an upload process which is based on an opportunistic upload scheme in a communication system supporting a plurality of RAIs according to an embodiment of the present disclosure. The operation related to the operation of performing the upload process which is based on the opportunistic upload scheme in the communication system supporting the plurality of RAIs according to an embodiment of the present disclosure has been described with reference to FIGS. 1, 2A and 2B, 3A and 3B, 4 to 9, 10A and 10B, 11A and 11B, and 12A and 12B, and a detailed description thereof will be omitted herein.

The transmitter 1311 transmits various signals and various messages to other entities, e.g., a Wi-Fi AP, an LTE BS, a proxy server, an original server, and/or the like included in the communication system supporting the plurality of RAIs under a control of the controller 1313. The various signals and various messages transmitted in the transmitter 1311 have been described with reference to FIGS. 1, 2A and 2B, 3A and 3B, 4 to 9, 10A and 10B, 11A and 11B, and 12A and 12B, and a detailed description thereof will be omitted herein.

The receiver 1315 receives various signals and various messages from other entities, e.g., a Wi-Fi AP, an LTE BS, a proxy server, an original server, and/or the like included in the communication system supporting the plurality of RAIs under a control of the controller 1313. The various signals and various messages received in the receiver 1315 have been described with reference to FIGS. 1, 2A and 2B, 3A and 3B, 4 to 9, 10A and 10B, 11A and 11B, and 12A and 12B, and a detailed description thereof will be omitted herein.

The storage unit 1317 stores various programs, various data, and the like related to the operation related to the operation of performing the upload process which is based on the opportunistic upload scheme in the communication system supporting the plurality of RAIs according to an embodiment of the present disclosure under a control of the controller 1313.

The storage unit 1317 stores various signals and various messages which are received by the receiver 1315 from the other entities.

While the transmitter 1311, the controller 1313, the receiver 1315, and the storage unit 1317 are described in the STA 1300 as separate units, it is to be understood that this is merely for convenience of description. In other words, two or more of the transmitter 1311, the controller 1313, the receiver 1315, and the storage unit 1317 may be incorporated into a single unit. The STA 1300 may be implemented with one processor.

An inner structure of an STA in a communication system supporting a plurality of RAIs according to an embodiment of the present disclosure has been described with reference to FIG. 13, and an inner structure of a proxy server in a communication system supporting a plurality of RAIs according to an embodiment of the present disclosure will be described with reference to FIG. 14.

Figure 14:
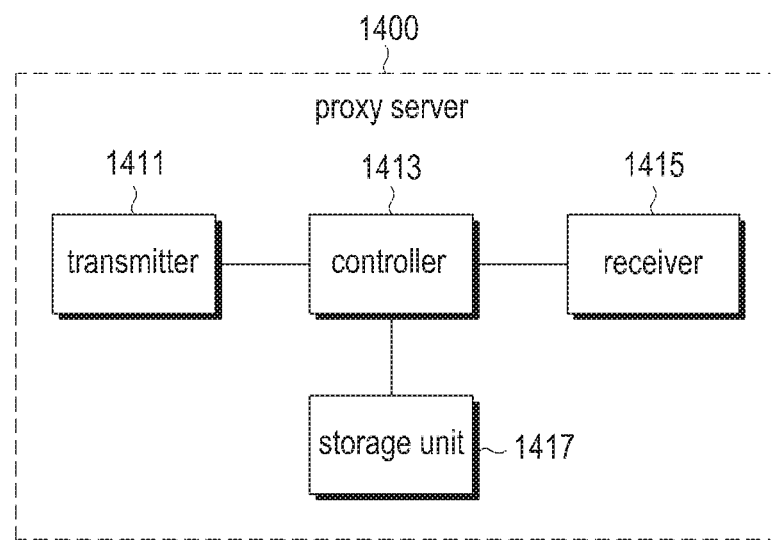
FIG. 14 schematically illustrates an inner structure of a proxy server in a communication system supporting a plurality of RAIs according to an embodiment of the present disclosure.

FIG. 14 schematically illustrates an inner structure of a proxy server in a communication system supporting a plurality of RAIs according to an embodiment of the present disclosure.

Referring to FIG. 14, a proxy server 1400 includes a transmitter 1411, a controller 1413, a receiver 1415, and a storage unit 1417.

The controller 1413 controls the overall operation of the proxy server 1400. The controller 1413 controls an operation related to an operation of performing an upload process which is based on an opportunistic upload scheme in a communication system supporting a plurality of RAIs according to an embodiment of the present disclosure. The operation related to the operation of performing the upload process which is based on the opportunistic upload scheme in the communication system supporting the plurality of RAIs according to an embodiment of the present disclosure has been described with reference to FIGS. 1, 2A and 2B, 3A and 3B, 4 to 9, 10A and 10B, 11A and 11B, and 12A and 12B, and a detailed description thereof will be omitted herein.

The transmitter 1411 transmits various signals and various messages to other entities, e.g., an STA, a Wi-Fi AP, an LTE BS, an original server, and/or the like included in the communication system supporting the plurality of RAIs under a control of the controller 1413. The various signals and various messages transmitted in the transmitter 1411 have been described with reference to FIGS. 1, 2A and 2B, 3A and 3B, 4 to 9, 10A and 10B, 11A and 11B, and 12A and 12B, and a detailed description thereof will be omitted herein.

The receiver 1415 receives various signals and various messages from other entities, e.g., an STA, a Wi-Fi AP, an LTE BS, an original server, and/or the like included in the communication system supporting the plurality of RAIs under a control of the controller 1413. The various signals and various messages received in the receiver 1415 have been described with reference to FIGS. 1, 2A and 2B, 3A and 3B, 4 to 9, 10A and 10B, 11A and 11B, and 12A and 12B, and a detailed description thereof will be omitted herein.

The storage unit 1417 stores various programs, various data, and the like related to the operation related to the operation of performing the upload process which is based on the opportunistic upload scheme in the communication system supporting the plurality of RAIs according to an embodiment of the present disclosure under a control of the controller 1413.

The storage unit 1417 stores various signals and various messages which are received by the receiver 1415 from the other entities.

While the transmitter 1411, the controller 1413, the receiver 1415, and the storage unit 1417 are described in the proxy server 1400 as separate units, it is to be understood that this is merely for convenience of description. In other words, two or more of the transmitter 1411, the controller 1413, the receiver 1415, and the storage unit 1417 may be incorporated into a single unit. The proxy server 1400 may be implemented with one processor.

An inner structure of a proxy server in a communication system supporting a plurality of RAIs according to an embodiment of the present disclosure has been described with reference to FIG. 14, and an inner structure of an original server in a communication system supporting a plurality of RAIs according to an embodiment of the present disclosure will be described with reference to FIG. 15.

Figure 15:
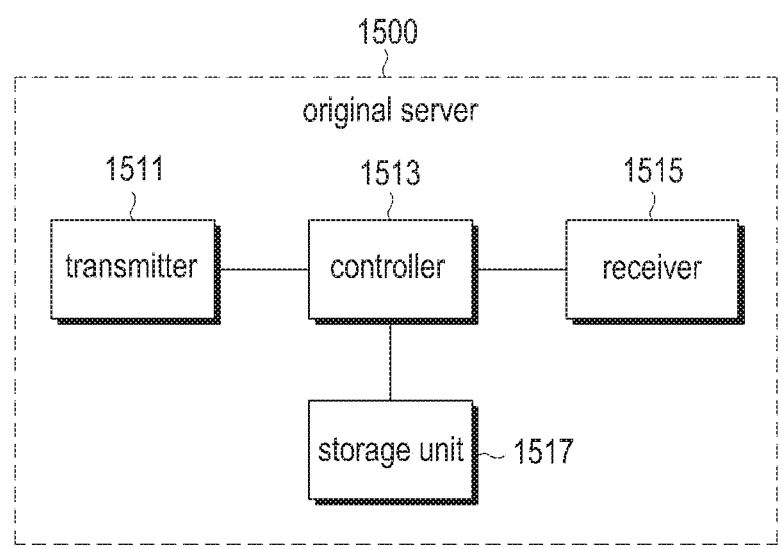
FIG. 15 schematically illustrates an inner structure of an original server in a communication system supporting a plurality of RAIs according to an embodiment of the present disclosure.

FIG. 15 schematically illustrates an inner structure of an original server in a communication system supporting a plurality of RAIs according to an embodiment of the present disclosure.

Referring to FIG. 15, an original server 1500 includes a transmitter 1511, a controller 1513, a receiver 1515, and a storage unit 1517.

The controller 1513 controls the overall operation of the original server 1500. The controller 1513 controls an operation related to an operation of performing an upload process which is based on an opportunistic upload scheme in a communication system supporting a plurality of RAIs according to an embodiment of the present disclosure. The operation related to the operation of performing the upload process which is based on the opportunistic upload scheme in the communication system supporting the plurality of RAIs according to an embodiment of the present disclosure has been described with reference to FIGS. 1, 2A and 2B, 3A and 3B, 4 to 9, 10A and 10B, 11A and 11B, and 12A and 12B, and a detailed description thereof will be omitted herein.

The transmitter 1511 transmits various signals and various messages to other entities, e.g., an STA, a Wi-Fi AP, an LTE BS, a proxy server, and/or the like included in the communication system supporting the plurality of RAIs under a control of the controller 1513. The various signals and various messages transmitted in the transmitter 1511 have been described with reference to FIGS. 1, 2A and 2B, 3A and 3B, 4 to 9, 10A and 10B, 11A and 11B, and 12A and 12B, and a detailed description thereof will be omitted herein.

The receiver 1515 receives various signals and various messages from other entities, e.g., an STA, a Wi-Fi AP, an LTE BS, a proxy server, and/or the like included in the communication system supporting the plurality of RAIs under a control of the controller 1513. The various signals and various messages received in the receiver 1515 have been described with reference to FIGS. 1, 2A and 2B, 3A and 3B, 4 to 9, 10A and 10B, 11A and 11B, and 12A and 12B, and a detailed description thereof will be omitted herein.

The storage unit 1517 stores various programs, various data, and the like related to the operation related to the operation of performing the upload process which is based on the opportunistic upload scheme in the communication system supporting the plurality of RAIs according to an embodiment of the present disclosure under a control of the controller 1513.

The storage unit 1517 stores various signals and various messages which are received by the receiver 1515 from the other entities.

While the transmitter 1511, the controller 1513, the receiver 1515, and the storage unit 1517 are described in the original server 1500 as separate units, it is to be understood that this is merely for convenience of description. In other words, two or more of the transmitter 1511, the controller 1513, the receiver 1515, and the storage unit 1517 may be incorporated into a single unit. The original server 1500 may be implemented with one processor.

As is apparent from the foregoing description, an embodiment of the present disclosure enables to upload data in a communication system supporting a plurality of RAIs.

An embodiment of the present disclosure enables to seamlessly upload data in a communication system supporting a plurality of RAIs.

An embodiment of the present disclosure enables to upload data based on opportunistic upload in a communication system supporting a plurality of RAIs.

An embodiment of the present disclosure enables to upload data by considering load balancing in a communication system supporting a plurality of RAIs.

An embodiment of the present disclosure enables to upload data with a high speed in a communication system supporting a plurality of RAIs.

An embodiment of the present disclosure enables to upload data by considering stability in a communication system supporting a plurality of RAIs.

An embodiment of the present disclosure enables to upload data thereby decreasing retransmission overhead in a communication system supporting a plurality of RAIs.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc (CD)-ROMs, magnetic tapes, floppy disks, optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for uploading data by a station in a mobile communication system supporting a plurality of radio access interfaces (RAIs), the method comprising:
upon detecting that there is content to be uploaded, determining whether a first RAI among the plurality of RAIs is available;
when the first RAI is available, transmitting a request message to a proxy server through the first RAI, wherein the request message comprises a header message including information related to the content and a body message including at least one of a plurality of segments which are generated based on the content; and
when a response message to the request message is received, starting with a first response message, from the proxy server, setting a size of a segment for next transmitting to a preset size larger than a segment size currently set.

2. The method of claim 1, further comprising:
stopping the transmitting of the body message upon detecting that the first RAI is unavailable while transmitting the body message.

3. The method of claim 2, further comprising:
detecting that the first RAI is available after stopping transmitting the body message; and
retransmitting the body message through the first RAI.

4. The method of claim 1, wherein the preset size is set to a size which is generated by adding the segment size currently set and a preset step size.

5. The method of claim 1, wherein the preset size is set to a size which is generated by multiplying the segment size currently set and a preset value.

6. The method of claim 1, wherein the preset size is set to a size less than a preset value.

7. A method for uploading data by a station in a mobile communication system supporting a plurality of radio access interfaces (RAIs), the method comprising:
detecting that there is content to be uploaded;
transmitting a request message to a proxy server through each of the plurality of RAIs, wherein the request message comprises a header message including information related to the content and a body message including at least one of a plurality of segments which are generated based on the content; and
when a response message to the request message is received, starting with a first response message, from the proxy server, setting a size of a segment for next transmitting to a preset size larger than a segment size currently set.

8. The method of claim 7, further comprising:
stopping transmitting the body message through a first RAI among the plurality of RAIs upon detecting that the first RAI among the plurality of RAIs is unavailable while transmitting the body message.

9. The method of claim 8, further comprising:
retransmitting the body message through one of the plurality of RAIs except for the first RAI among the plurality of RAIs after stopping transmitting the body message through the first RAI.

10. The method of claim 7, wherein the preset size is set to a size which is generated by adding the segment size currently set and a preset step size.

11. The method of claim 7, wherein the preset size is set to a size which is generated by multiplying the segment size currently set and a preset value.

12. The method of claim 7, wherein the preset size is set to a size less than a preset value.

13. A method for supporting data upload of a station by a proxy server in a mobile communication system supporting a plurality of radio access interfaces (RAIs), the method comprising:
receiving a request message from the station through at least one of the plurality of RAIs, wherein the request message comprises a header message including information related to content and a body message including at least one of a plurality of segments which are generated based on the content;
when the at least one of the plurality of RAIs becomes unavailable while the at least one of the plurality of segments is being received, stopping an upload and storing a part of the at least one of the plurality of segments that is received; and
when the at least one of the plurality of RAIs is available again, receiving a request message based to begin receiving a remaining part of the at least one of the plurality of segments for which the upload is stopped.

14. The method of claim 13, further comprising:
detecting that reception for the plurality of segments has been completed; and
generating the content by reassembling the plurality of segments and transmitting a request message including the content to an original server.

15. A station for uploading data in a mobile communication system supporting a plurality of radio access interfaces (RAIs), the station comprising:
a transceiver configured to transmit or receive data; and
a processor configured to:
determine whether a first RAI among the plurality of RAIs is available, upon detecting that there is content to be uploaded,
control the transceiver to transmit a request message to a proxy server through the first RAI, wherein the request message comprises a header message including information related to the content and a body message including at least one of a plurality of segments which are generated based on the content, when the first RAI is available, and
set a size of a segment for next transmitting to a preset size larger than a segment size currently set, when the transceiver received a response message to the request message, starting with a first response message, from the proxy server.

16. A station for uploading data in a mobile communication system supporting a plurality of radio access interfaces (RAIs), the station comprising:
a transceiver configured to transmit or receive data; and
a processor configured to:
detect that there is content to be uploaded,
control the transceiver to transmit a request message to a proxy server through each of the plurality of RAIs, wherein the request message comprises a header message including information related to the content and a body message including at least one of a plurality of segments which are generated based on the content, and
set a size of a segment for next transmitting to a preset size larger than a segment size currently set, when the transceiver received a response message to the request message, starting with a first response message, from the proxy server.

17. A proxy server for supporting data upload of a station in a mobile communication system supporting a plurality of radio access interfaces (RAIs), the proxy server comprising:
a transceiver configured to transmit or receive data;
a memory configured to store data; and
a processor configured to:
control the transceiver to receive a request message from the station through at least one of the plurality of RAIs, wherein the request message comprises a header message including information related to content and a body message including at least one of a plurality of segments which are generated based on the content,
stop an upload and store, in the memory, a part of the at least one of the plurality of segments that is received, when the at least one of the plurality of RAIs becomes unavailable while the at least one of the plurality of segments is being received, and
control the transceiver to receive a request message to begin receiving a remaining part of the at least one of the plurality of segments for which the upload is stopped, when the at least one of the plurality of RAIs is available again.

* * * * *